May 6, 1958  R. E. BOYDEN ET AL  2,833,466
CALCULATING MACHINE, INCLUDING ORDINALLY SHIFTABLE
FACTOR STORAGE AND VALUE
ENTRY CONTROL DEVICES
Filed Nov. 16, 1953  17 Sheets-Sheet 6

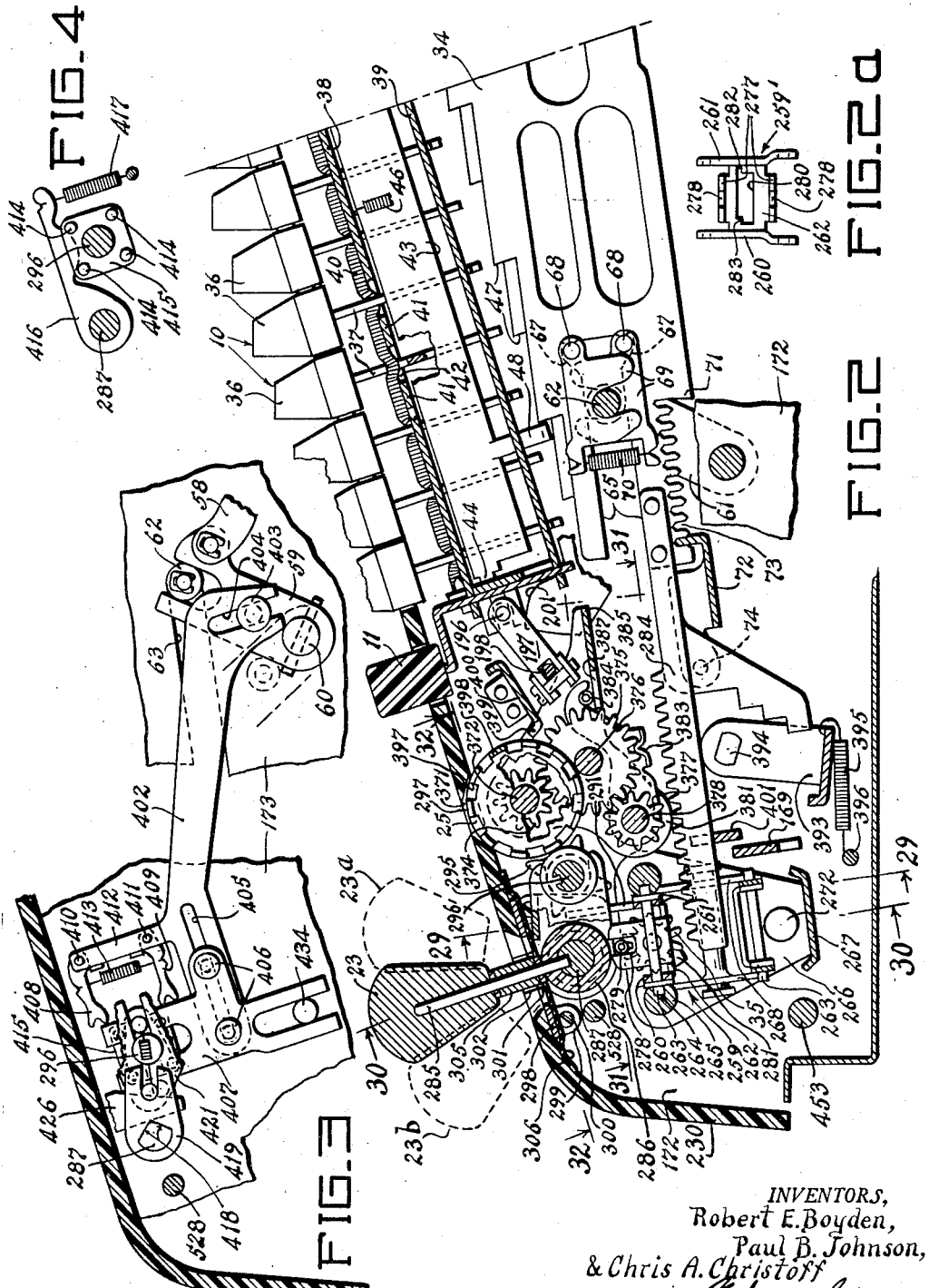

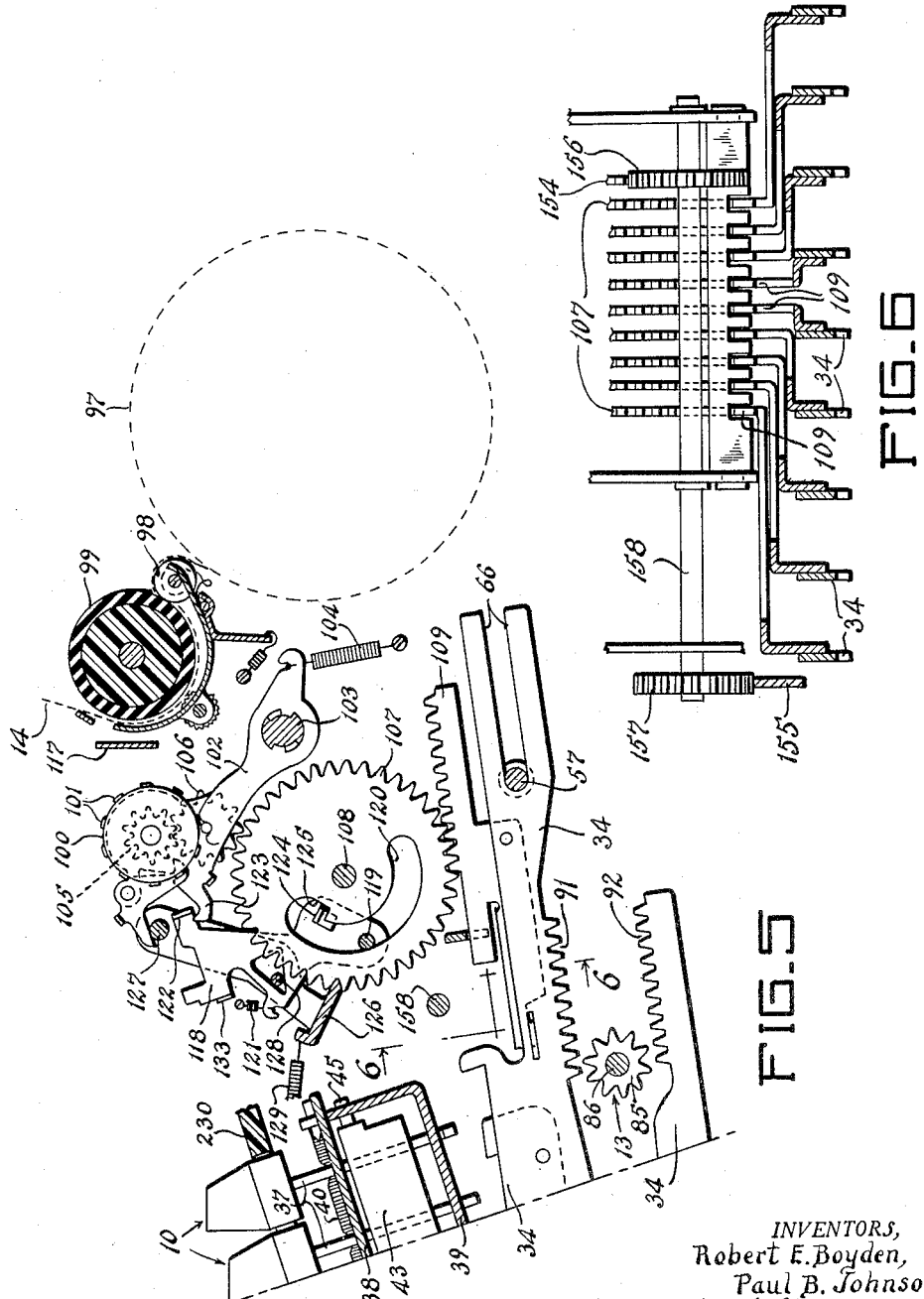

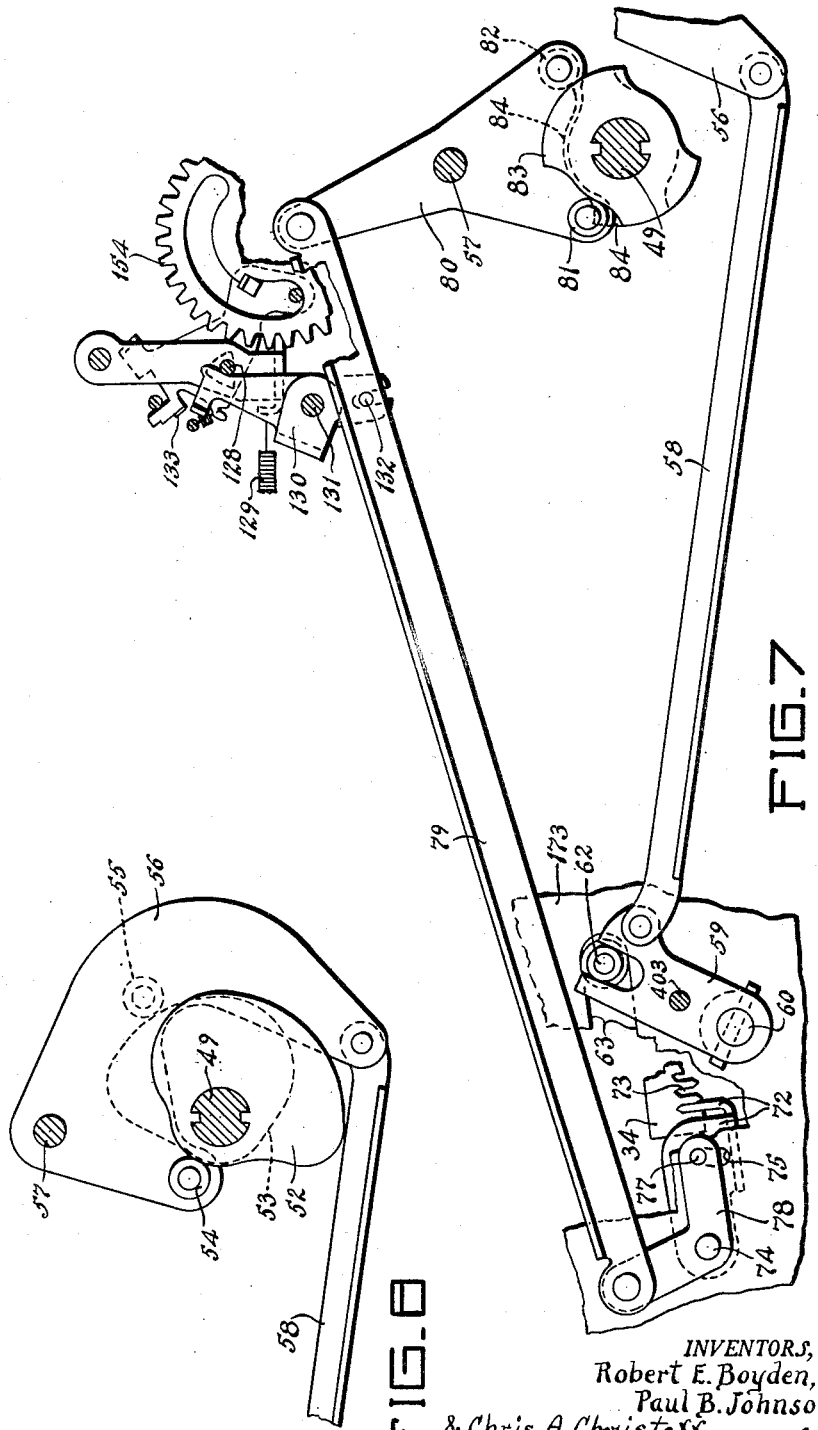

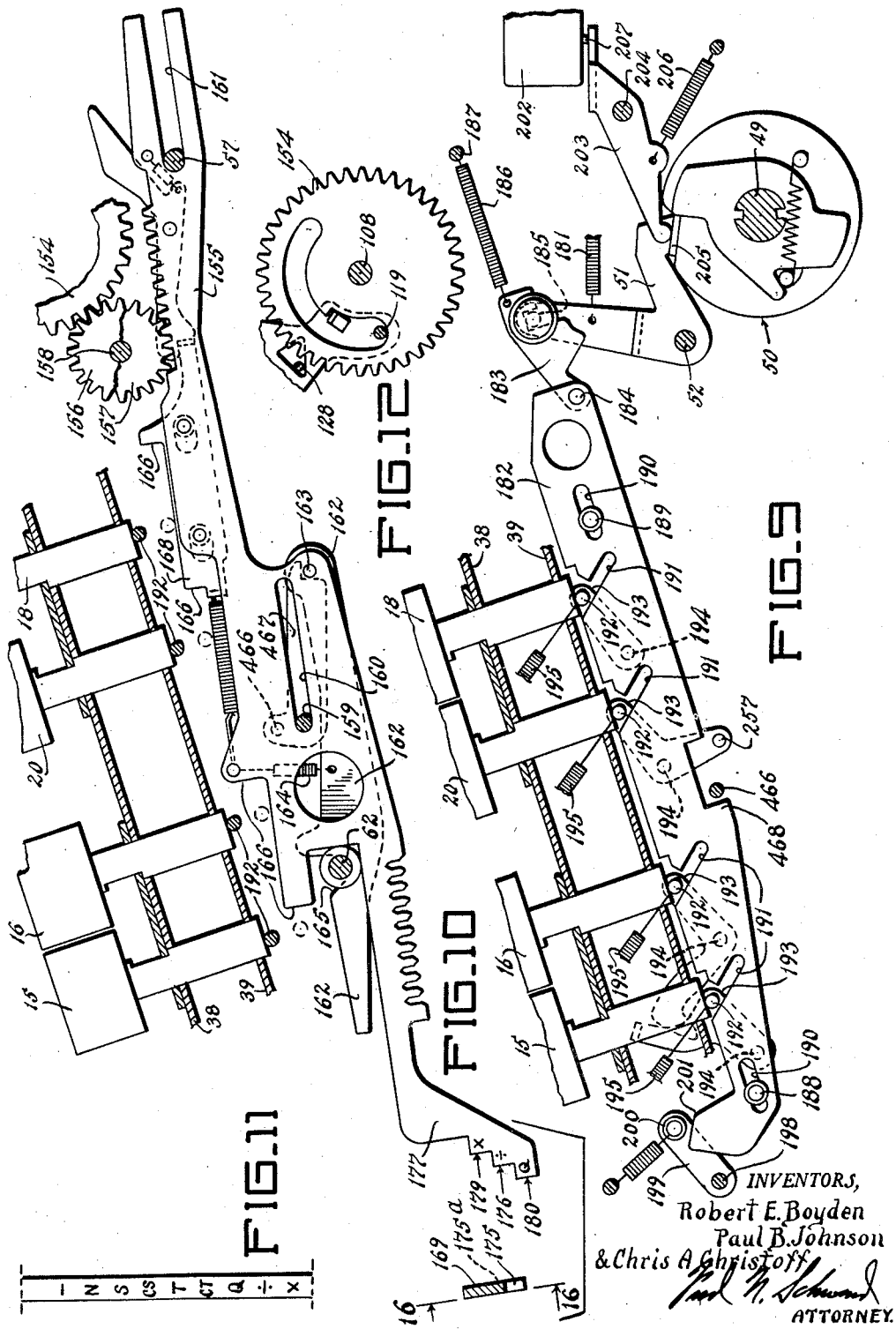

INVENTORS,
Robert E. Boyden,
Paul B. Johnson,
& Chris A. Christoff

ATTORNEY.

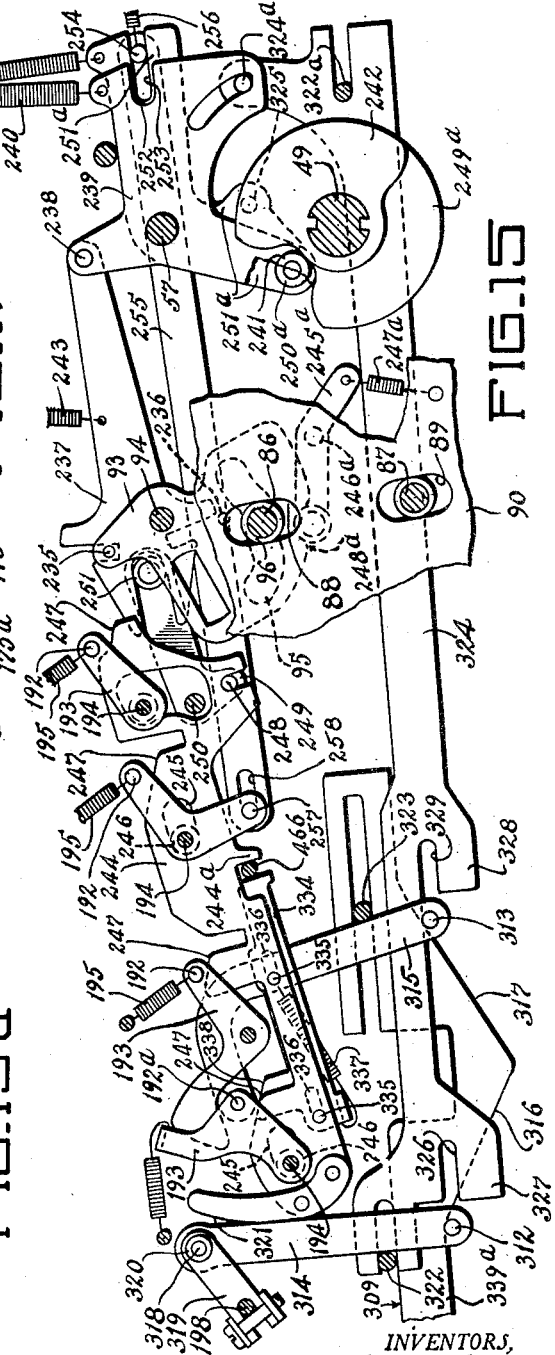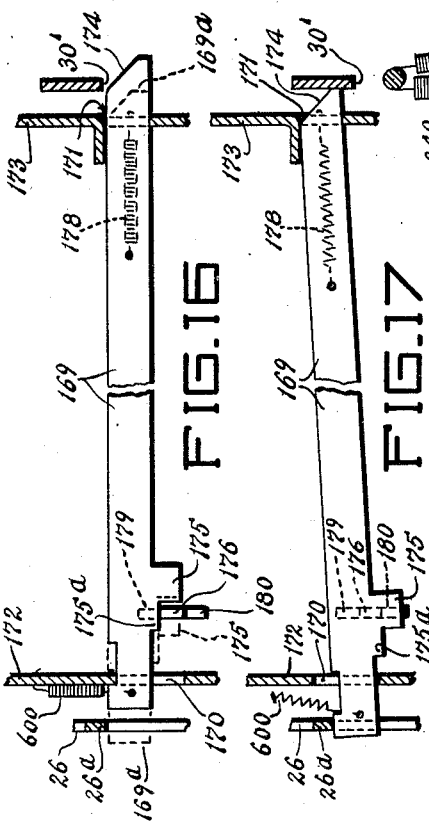

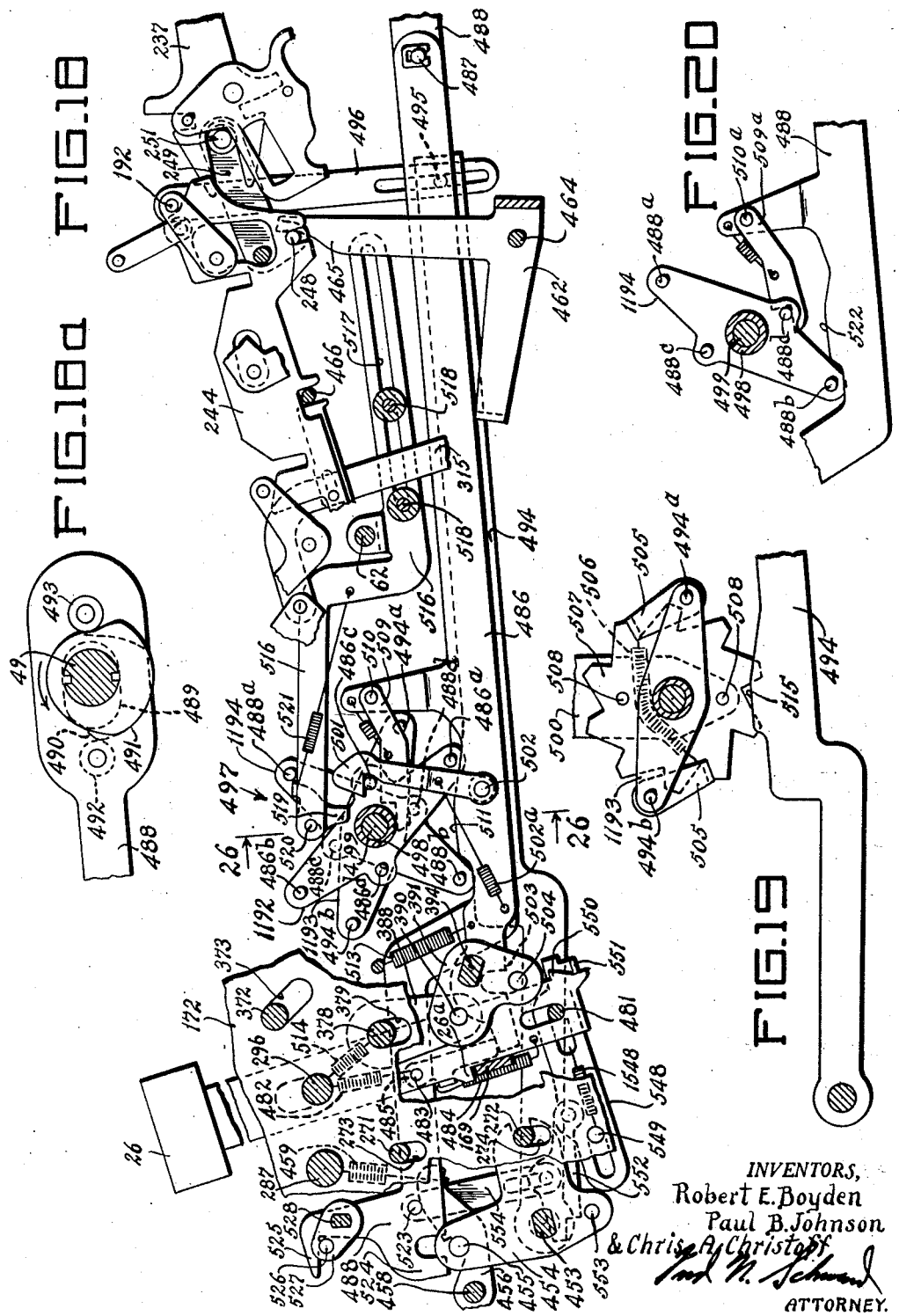

May 6, 1958 R. E. BOYDEN ET AL 2,833,466
CALCULATING MACHINE, INCLUDING ORDINALLY SHIFTABLE
FACTOR STORAGE AND VALUE
ENTRY CONTROL DEVICES
Filed Nov. 16, 1953 17 Sheets-Sheet 9
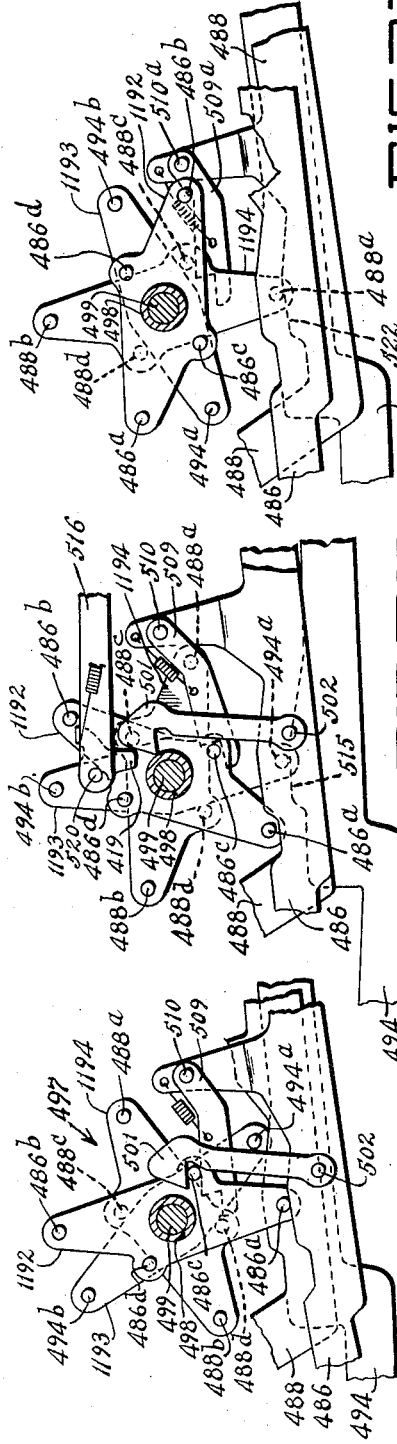
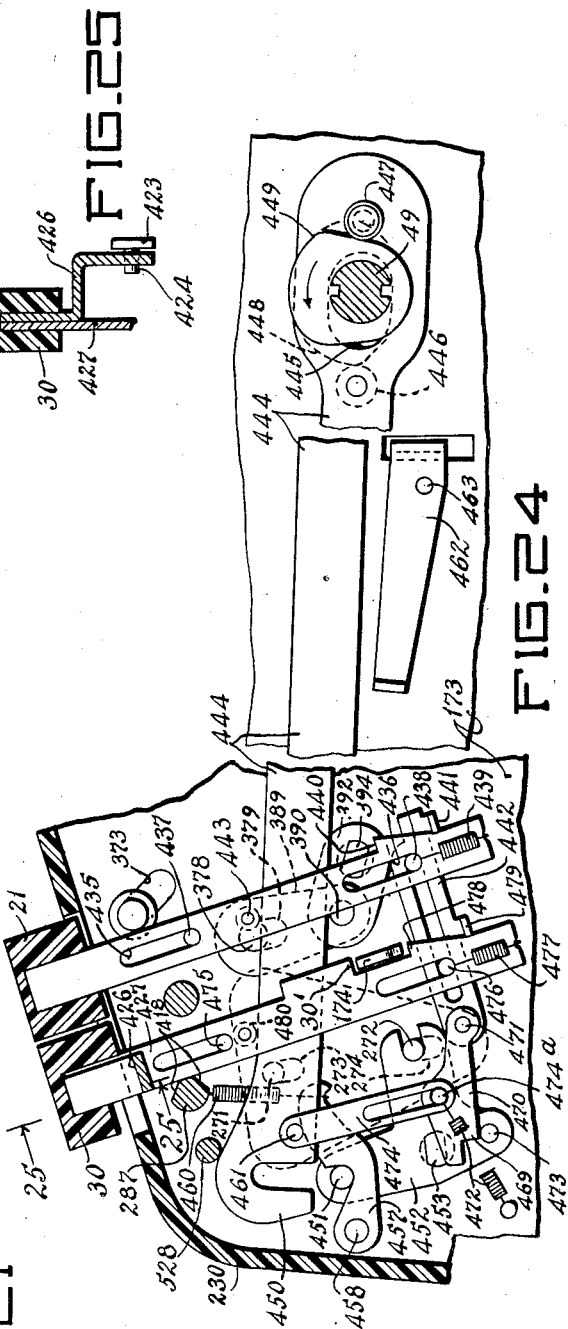
INVENTORS,
Robert E. Boyden,
Paul B. Johnson,
& Chris A. Christoff
ATTORNEY.

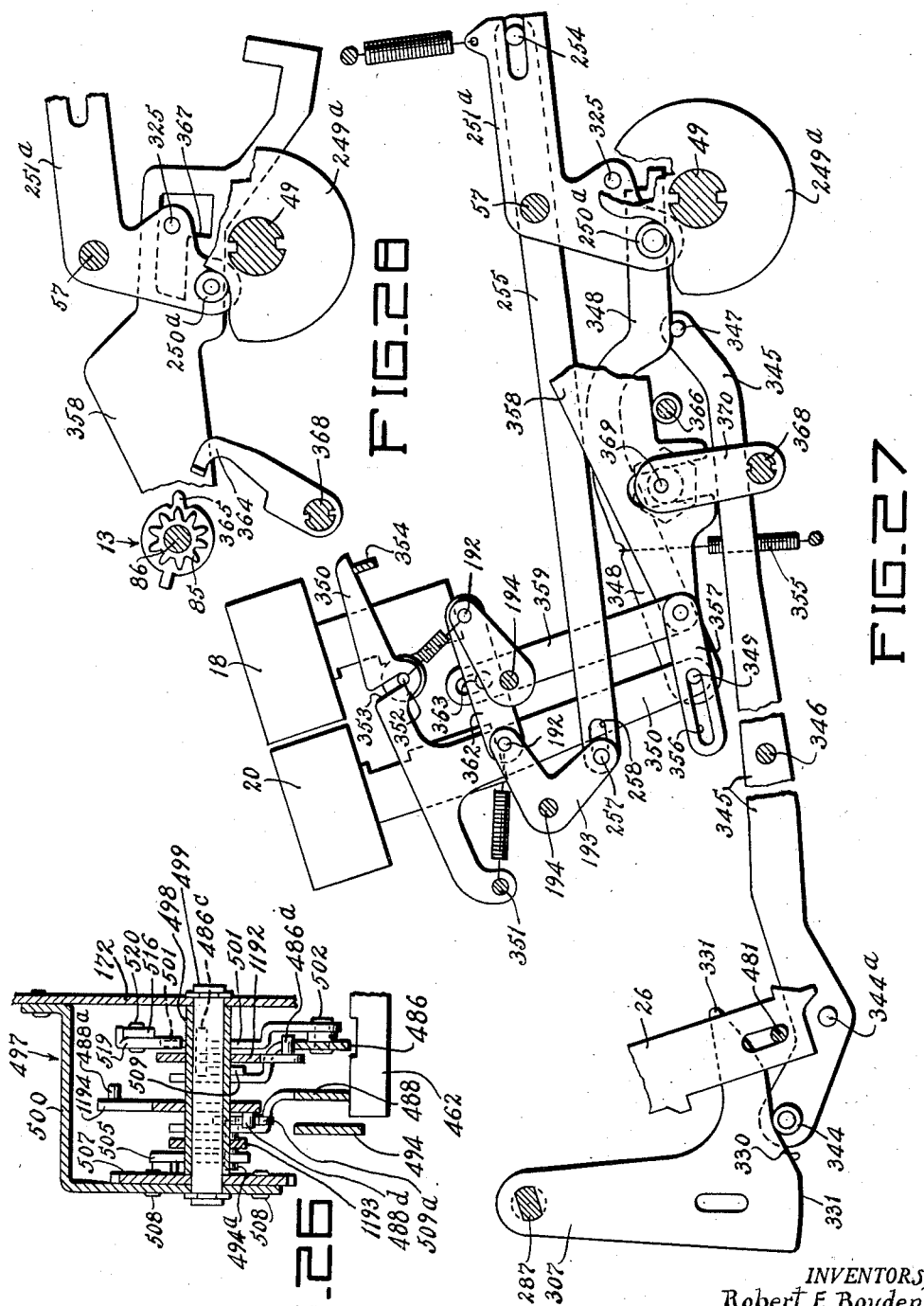

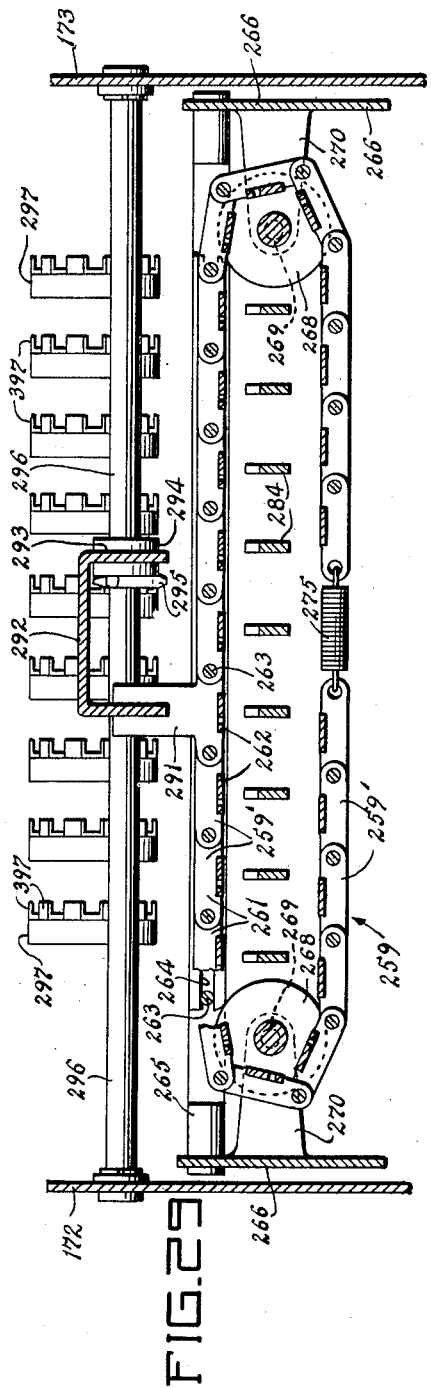
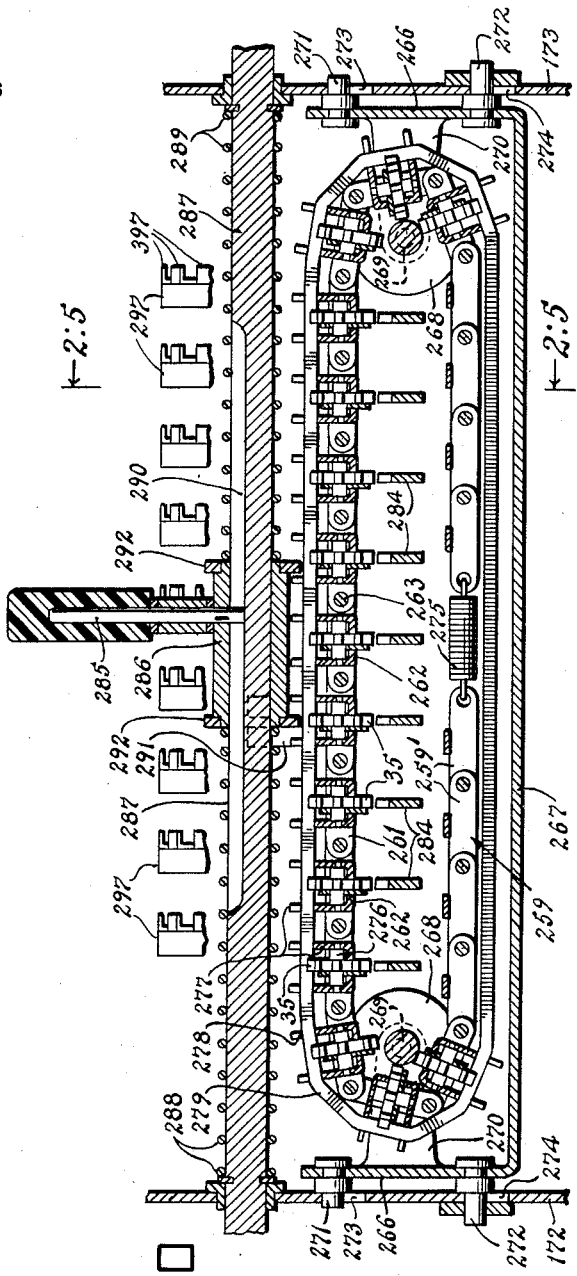

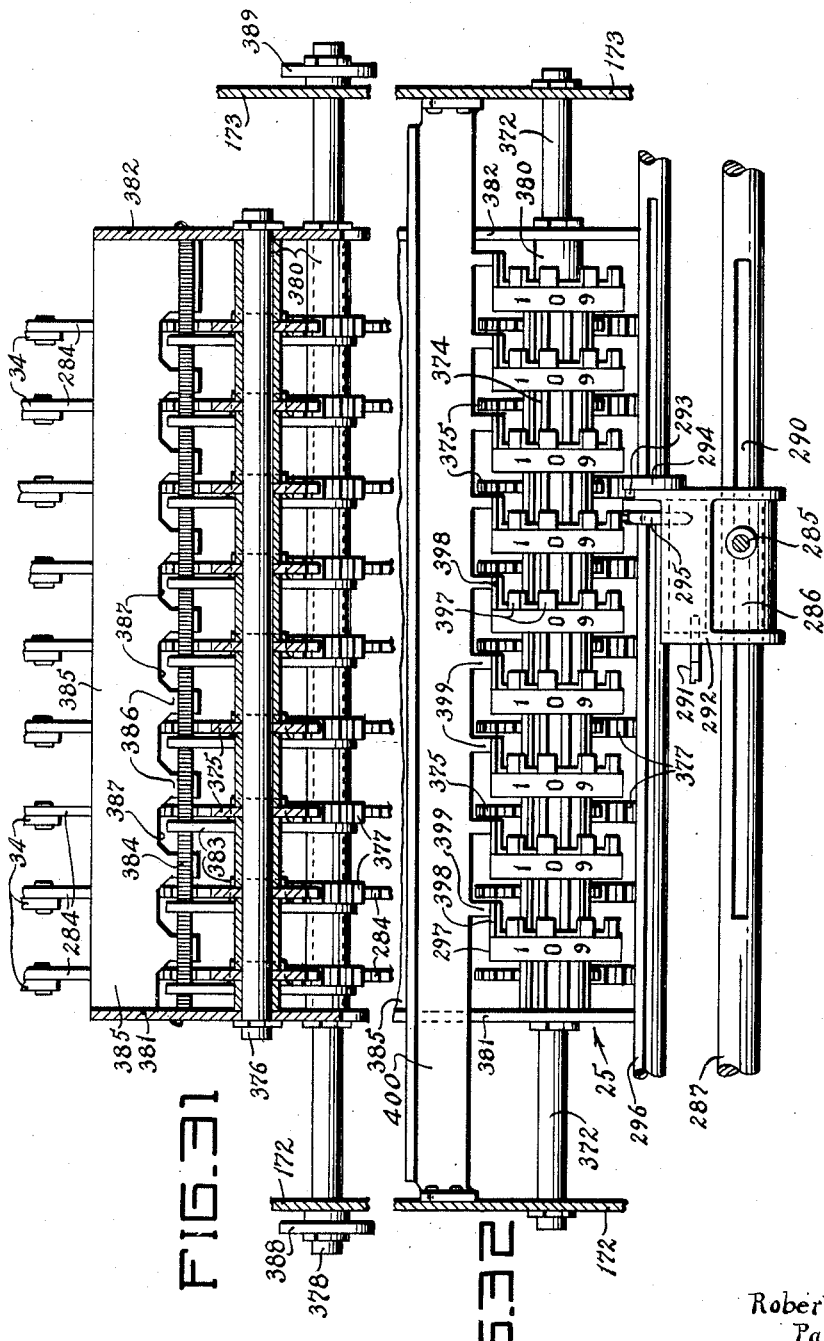

May 6, 1958
R. E. BOYDEN ET AL
2,833,466
CALCULATING MACHINE, INCLUDING ORDINALLY SHIFTABLE
FACTOR STORAGE AND VALUE
ENTRY CONTROL DEVICES
Filed Nov. 16, 1953
17 Sheets-Sheet 13
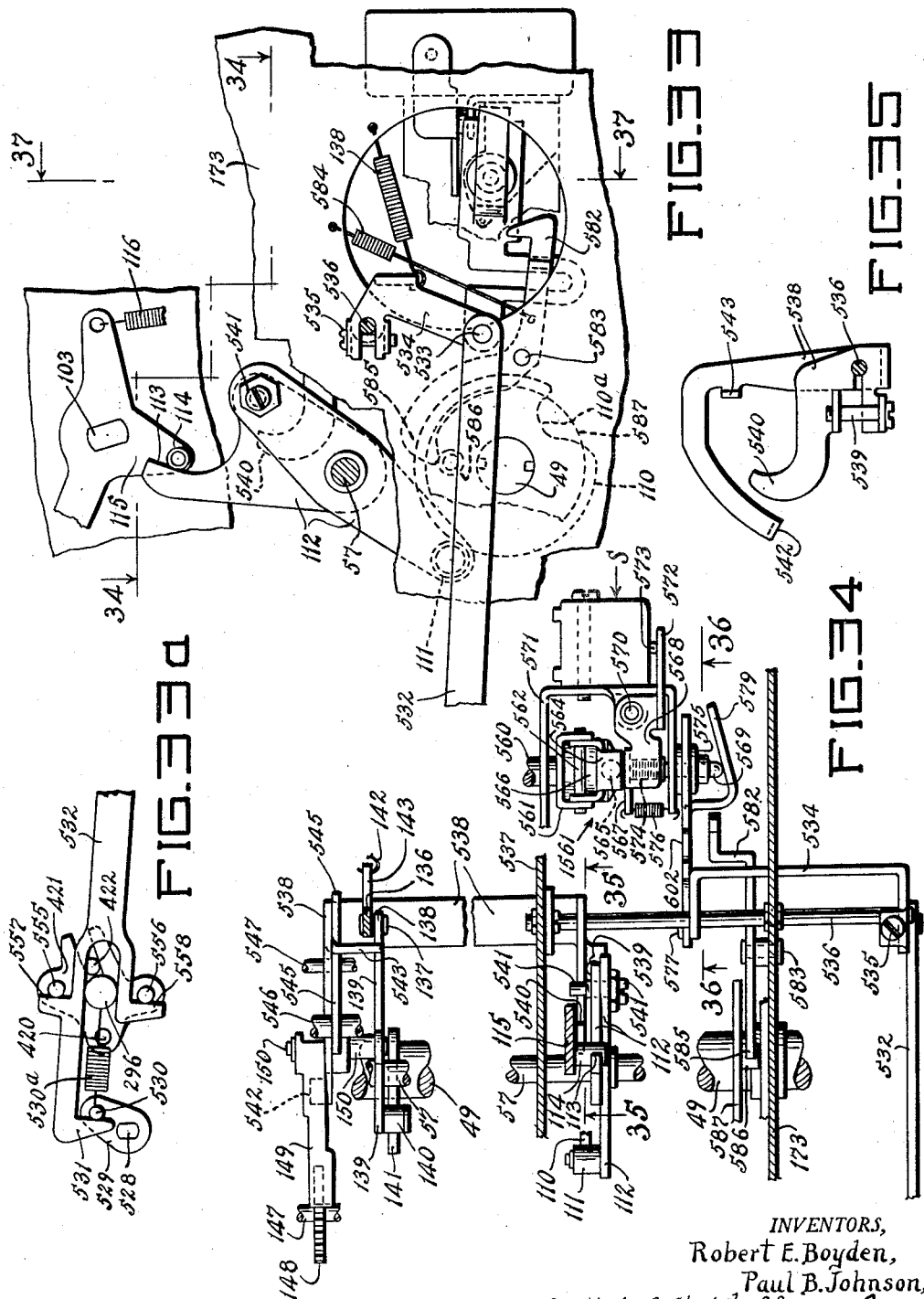
INVENTORS,
Robert E. Boyden,
Paul B. Johnson,
& Chris A. Christoff
ATTORNEY.

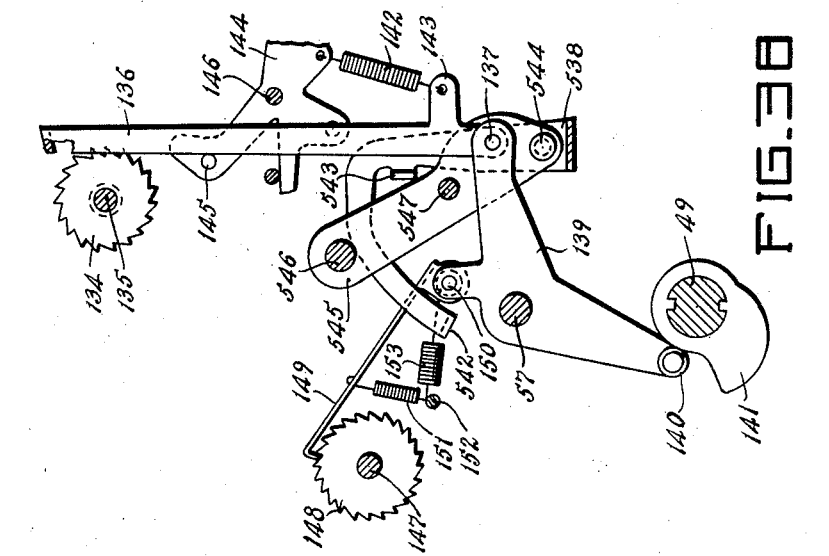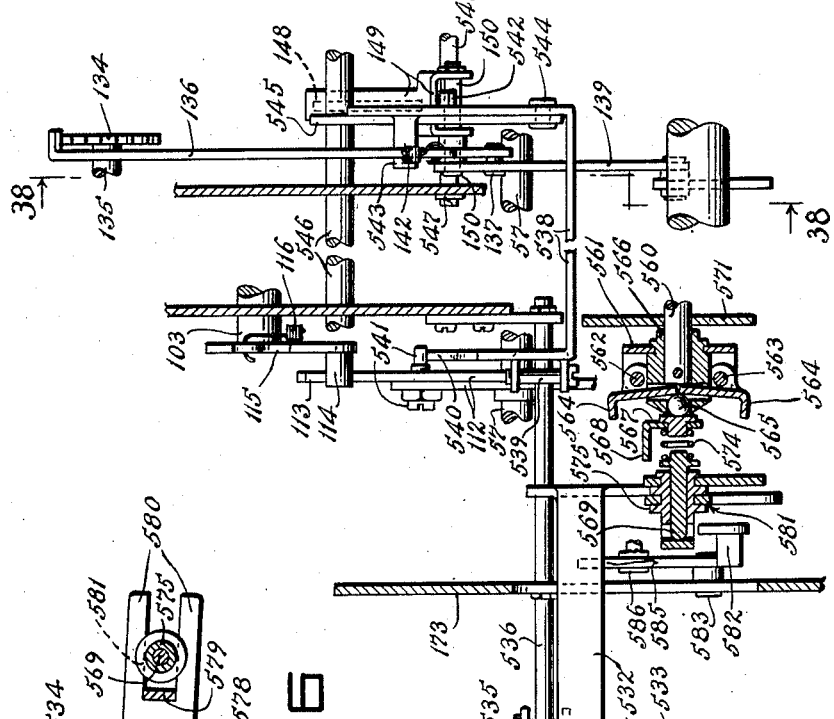

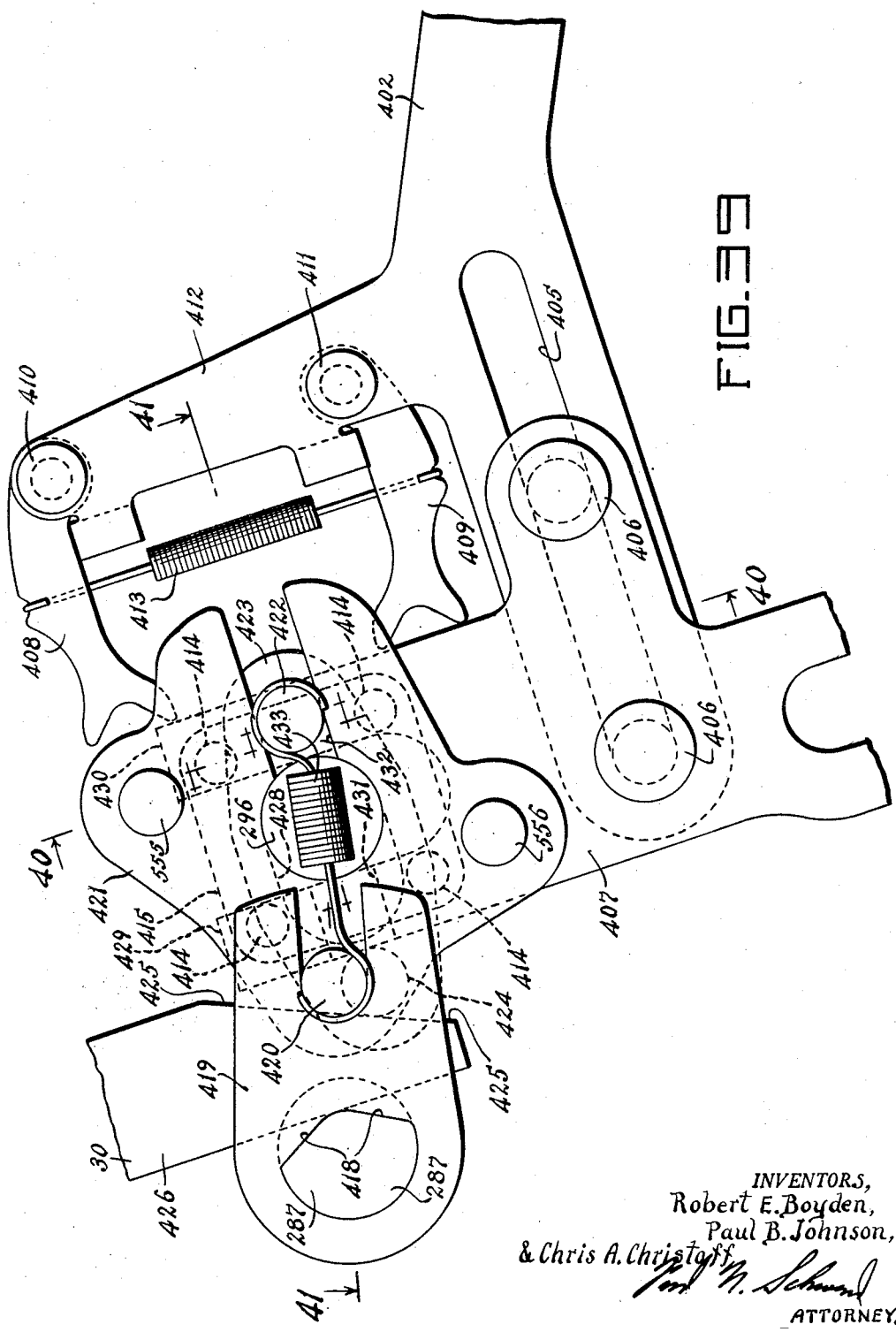

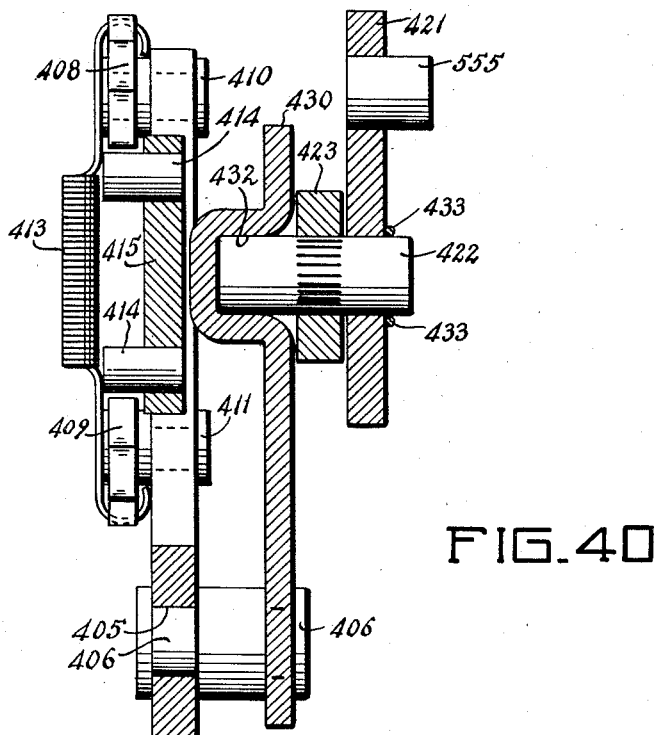
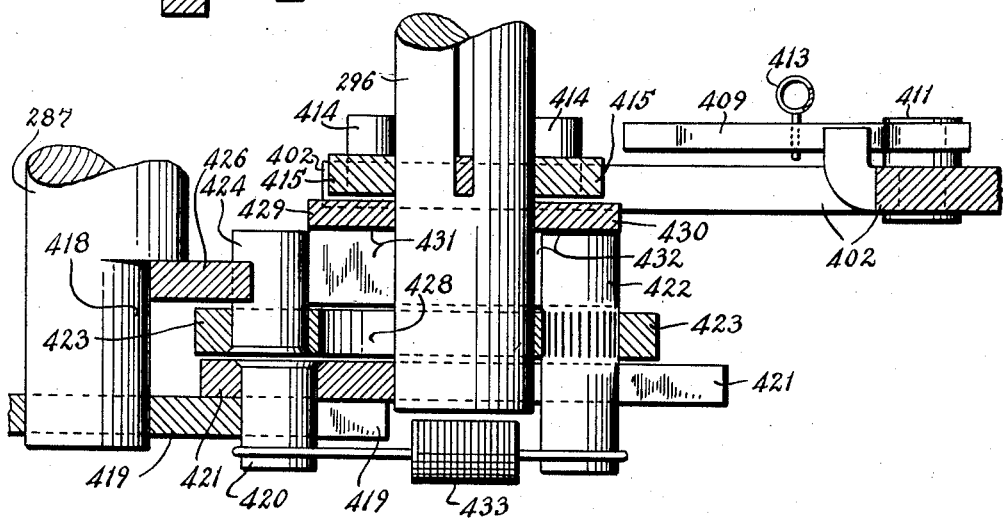
FIG. 40
FIG. 41
INVENTORS,
Robert E. Boyden
Paul B. Johnson
& Chris A. Christoff
ATTORNEY.

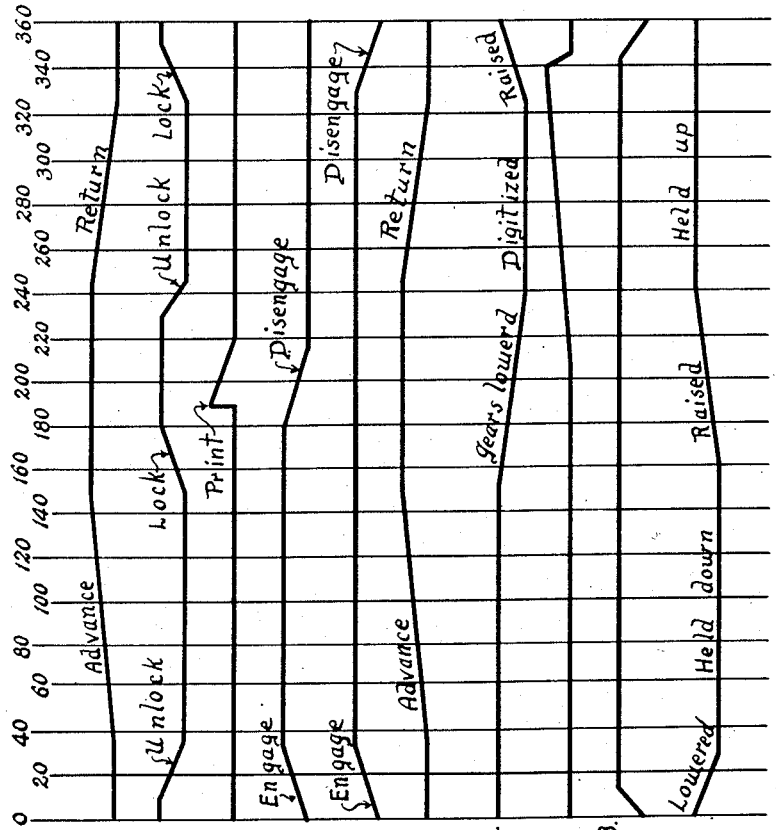

United States Patent Office 2,833,466
Patented May 6, 1958

2,833,466

CALCULATING MACHINE, INCLUDING ORDINALLY SHIFTABLE FACTOR STORAGE AND VALUE ENTRY CONTROL DEVICES

Robert E. Boyden, San Gabriel, Paul B. Johnson, Los Angeles, and Chris A. Christoff, San Gabriel, Calif., assignors to Clary Corporation, a corporation of California Application November 16, 1953, Serial No. 392,190

10 Claims. (Cl. 235—60)

This invention relates to cyclically operable calculating machines of the type capable of performing the four cardinal types of calculation, i. e., addition, subtraction, multiplication and division, and including devices for recording the factors and results of such calculations.

Generally speaking, mechanical calculating machines capable of performing such calculations as multiplication and division embody transversely shiftable registers, transversely shiftable differential actuators or transversely shiftable amount entry devices in order to facilitate the calculating process and reduce to a minimum the number of cycles required to solve different problems, wherein an active factor, such as a multiplier factor, embodies a plurality of digits.

In the foregoing types of calculating machines it was heretofore necessary to increase the width of the machine, or at least certain portions thereof materially beyond the width of the actuator section in order to permit relative shifting of the register and actuators or relative shifting of the amount entry devices and the actuators. For example, ten key amount entry devices have been employed for effecting shifting of an amount relative to the actuators. Such entry devices included a pin carriage or the like having selectively settable stop elements positioned by a group of ten keys ranging in value from 0 to 9, such stop elements being effective to differentially control the extent of movement of aligned actuators. The pin carriage is shiftable in a step-by-step movement across the actuators. In order to permit traverse of the pin carriage across a whole group of actuators and yet maintain the machine within acceptable limits of width, the actuators must be spaced very close to each other, thus imposing a considerable hardship from the standpoint of restrictions in design and service due to the close spacing of the parts. For example, lateral tolerances of the parts such as amount entry device, accumulator, etc., must be reduced and maintained correspondingly.

Therefore, it is a principal object of the present invention to provide, in a mechanical calculating machine, a relatively shiftable amount entry device and a group of differential actuators controlled thereby without extending the width of the machine materially beyond the width of the actuator group.

Another object of the invention is to render a calculating machine of the above type very flexible in operation and capable of solving a wide variety of problems.

Another object is to provide a single manipulable control member to both selectively position an amount entry device relative to differential actuators controlled thereby and to control operation of the machine.

Another object is to provide a single manipulable control member to both selectively position an amount entry device relative to differential actuators controlled thereby and to selectively control additive and subtractive operations of the machine.

Another object is to provide a calculating machine capable of multiplying and dividing and recording the factors and results of such calculations in sequence without recording the intermediate results or factors of such calculations.

A further object is to provide a recording-calculating machine capable of recording the factors and results of multiplication, etc., about a fixed decimal point position.

A further object is to modify a recording, adding and subtracting machine to facilitate solving problems in multiplication and division.

A further object is to provide an improved program control mechanism capable of effecting a series of successive calculations in a predetermined manner.

A further object is to automatically control the speed of operation of the machine in accordance with the type of calculation being performed.

The manner in which the above and other objects of the invention are accomplished will be readily understood on reference to the following specification when read in conjunction with the accompanying drawings wherein:

Fig. 2 is a partial longitudinal sectional view through the machine which, combined with Fig. 5, is taken along the line 2:5—2:5 of Fig. 1 and also line 2:5—2:5 of Fig. 30.

Fig. 2a is a plan view of one of the storage gear link brackets.

Fig. 3 is a side elevational view of the counter reversing mechanism which is located on the right hand side of the machine.

Fig. 4 is a sectional view of a centralizer pawl for the counter actuator, which pawl is located directly under and associated with the parts shown in Fig. 3.

Fig. 5 is a partial longitudinal sectional view through the machine and is taken along the rear portion of the line 2:5—2:5 of Fig. 1.

Fig. 6 is a sectional view of the offset actuator racks taken on line 6—6 of Fig. 5.

Fig. 7 is a side view illustrating the rack and printer lock controls and part of the rack drive instrumentalities.

Fig. 8 is a side view illustrating the rack drive cams and cam follower.

Fig. 9 is a sectional side elevational view taken along the left-hand side of the machine and illustrating the motor and clutch controls.

Fig. 10 is a sectional side elevational view, taken along the left-hand side of the machine, illustrating part of the symbol printing controls which are further illustrated in Fig. 16 and Fig. 17.

Fig. 11 is a developed view of the symbol printing dial.

Fig. 12 is an elevational sectional view of the symbol printer idler gear.

Figs. 15 and 15a are coextensive, side elevational views, taken along the left-hand side of the machine, illustrating the accumulator positioning controls.

Fig. 16 is a sectional view taken along the line 16—16 of Fig. 10 showing in full lines the position of a bar for stopping the symbol rack in the "×" printing position and showing in broken lines the position of said bar in the "÷" printing position.

Fig. 17 is a view similar to Fig. 16 but showing the bar in the "Q" printing position.

Figs. 18 and 18a are coextensive elevational sectional views taken along the left-hand side of the machine illustrating the controls and cams used for obtaining either the quotient or product.

Fig. 19 is an elevational view of a centralizer ratchet located behind and associated with the controls shown in Fig. 18.

Fig. 20 is a more detailed view of certain parts also shown in Fig. 18.

Figure 1:
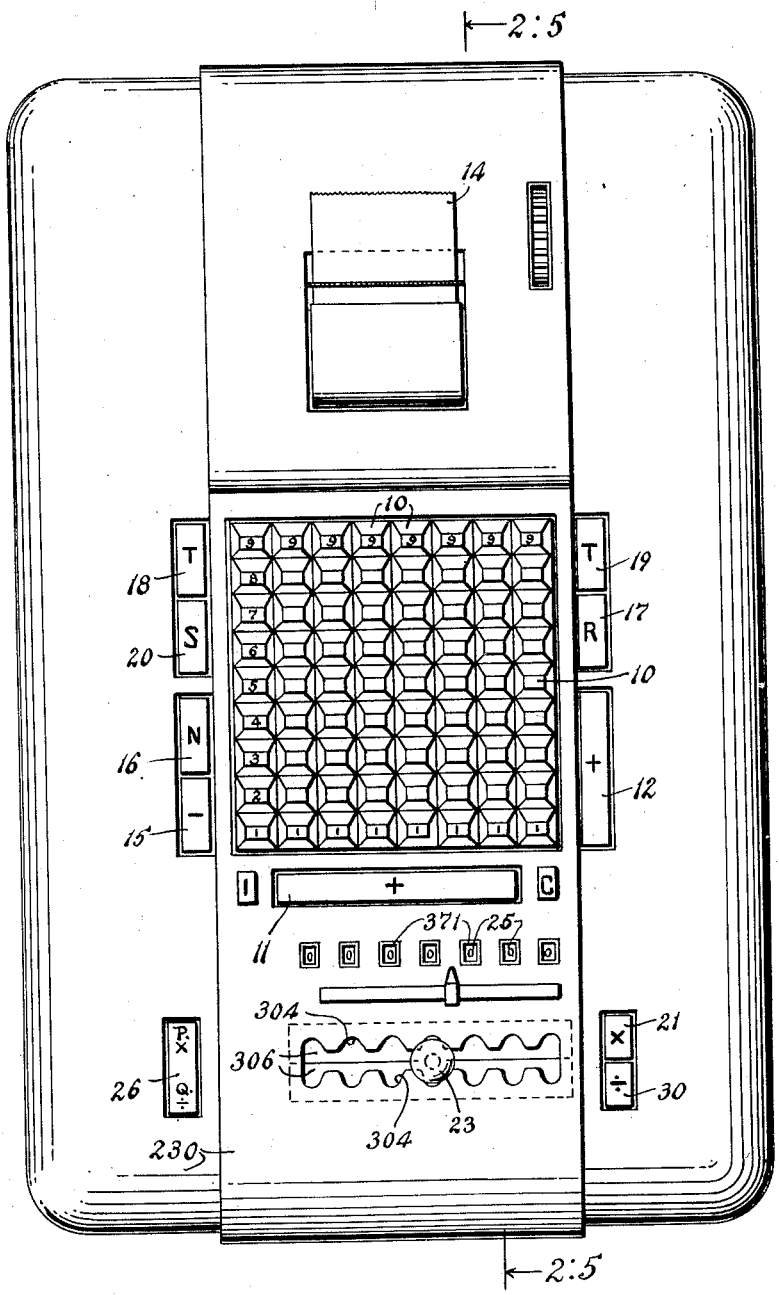
Fig. 1 is a plan view of a machine embodying a preferred form of the invention.

Figs. 21, 22, and 23 are views of a lever operating pinwheel, also shown in Fig. 18, illustrating successively and respectively the controlled movement of a counter gear lever, a totalizer lever and a storage gear lever.

Fig. 24 is a sectional view taken along the right-hand side of the machine illustrating the storage gear lowering controls and cams.

Fig. 25 is a sectional view of a key provided for setting the controls shown in both Figs. 24 and 3 and is taken along the line 25—25 of Fig. 24.

Fig. 26 is a sectional view taken along the line 26—26 of Fig. 18.

Fig. 27 is a sectional elevational view, taken along the left-hand side of the machine, illustrating the controls effecting totalling and for clearing the keyboard.

Fig. 28 is a sectional fragmentary continuation of some of the totalling control parts shown in Fig. 27.

Fig. 29 is a sectional view taken along line 29—29 of Fig. 2 illustrating a storage gear carrier chain.

Fig. 30 is a sectional view similar to Fig. 29 but taken along the line 30—30 of Fig. 2.

Fig. 31 is a sectional plan view of the counter gear arrangement and is taken along the line 31—31 of Fig. 2.

Fig. 32 is a sectional plan view of the counters taken along the line 32—32 of Fig. 2.

Figs. 33 and 33a are coextensive fragmentary side elevational views taken along the right-hand side of the machine illustrating a part of the printer suppressing mechanism and the motor-governor or speed control.

Fig. 34 is a sectional view taken along the line 34—34 of Fig. 33.

Fig. 35 is a sectional elevational view of a printer suppressor hook and is taken along the line 35—35 of Fig. 34.

Fig. 36 is a sectional view taken along the line 36—36 of Fig. 34.

Fig. 37 is a sectional view of the motor governor and related parts and is taken along the line 37—37 of Fig. 33.

Fig. 38 is a sectional view taken along the line 38—38 of Fig. 37.

Fig. 39 is an enlarged view of the counter actuator reversing mechanism illustrated in Fig. 3.

Fig. 40 is a vertical sectional view taken along the line 40—40 of Fig. 39.

Fig. 41 is a sectional plan view taken along the line 41—41 of Fig. 39.

Fig. 42 is a timing chart showing in graphical form the operation of various drive elements of the machine.

*General arrangement*

The particular machine illustrated as embodying the present invention is based partly on the well-known Clary adding machine, portions of which are disclosed and claimed in the following United States patents: No. 2,472,696 issued on June 7, 1949 to Edward P. Drake; No. 2,490,200 issued on December 6, 1949 to Robert E. Boyden; No. 2,492,263 issued on December 27, 1949 to Robert E. Boyden; No. 2,406,337 issued May 2, 1950 to Robert E. Boyden; and No. 2,583,810 issued on January 29, 1952 to Robert E. Boyden.

The present machine is motor driven under control of various motorized control bars and a multiply-divide control lever. The latter controls are arranged to be operated in various sequences in order to perform various desired calculations or combinations of such calculations, including addition, subtraction, division and multiplication.

A rotary drive shaft operated by the motor is provided to effect various machine functions, the drive shaft carrying various control cams for operating respective units of the machine. The drive shaft is effective under control of a cyclic clutch to rotate one complete revolution for each machine cycle.

Referring in general to Fig. 1, an amount to be added or substracted, the dividend and the divisor in the case of a division calculations, and the multiplicand factor in the case of a multiplication calculation, is entered into the machine by depressing appropriate amount keys 10 of the machine keyboard.

In order to add an amount, one or the other of two add bars 11 and 12 is depressed, causing a cycle of operation of the machine to add the amount into an accumulator 13 (Fig. 5) and to print this factor on a paper strip 14. If the amount set up on the keys 10 is to be subtracted from an amount registered on the accumulator, a minus bar 15 is depressed.

If it is desired to print an amount set up on the keys but not to enter the same into the accumulator or other calculating units, a nonadd bar 16 is depressed. In order to add the same amount into the accumulator two or more times, a repeat bar 17 is depressed and held down until the requisite number of cycles, one for each addition, are made by the machine.

When it is desired to obtain the net total amount registered by the accumulator, one or the other of two total bars 18 and 19 is depressed. This will print the total and clear the accumulator to zero. In the event, however, it is desired to obtain a subtotal, a subtotal bar 20 is depressed, causing the amount registered in the accumulator to be printed but retained in the accumulator.

In performing multiplication calculations, the multiplicand is entered into the amount keys 10 and a multiplicand entry key 21 is depressed, transferring the amount from the keys into a multiplicand-divisor storage unit 35 (Figs. 2, 29 and 30) to be described hereinafter. At this time the printing mechanism is actuated to record the multiplicand as at 22 (Fig. 14) on the recording tape 14 and the multiplier is entered into the machine by manipulation of a multiply-divide handle 23. The latter is slidable laterally of the machine into different denominational relationships relative to the amount keys and accumulator and is also rockable fore or aft of the machine to respectively effect add or subtract cycling. Thus, to obtain the product of a multiplicand factor by a multiplier factor of, for example, 45, indicated at 24, the handle 23 would first be shifted to its tens denominational position and then rocked rearwardly, from the operator, and held there until the machine has additively cycled four times. Thereafter, the handle would be shifted to the right one step to its units denominational position and rocked rearwardly to effect five additive cycles of the machine. During this operation the multiplier factor of 45 would be entered into a multiplier-quotient counter 25 and the product would be accumulated in the machine accumulator 13 (Fig. 5). However, the printing mechanism would be disabled.

In order to record the multiplier factor and the product as well as clear the machine for subsequent calculations, a product-quotient key 26 would be depressed, clearing the counter 25 and printing first, the multiplier factor on the tape at 24, directly below the multiplicand factor 22 (Fig. 14) as indicated and then printing the product directly below the multiplier factor as indicated at 27.

It should be noted that the multiplicand and multiplier factors, and the product, are all printed in decimally correct relation and with the decimal points all in vertical alignment.

In division calculations, the dividend is first entered into the amount keys 10 and thereafter entered into the machine accumulator 13 by depression of one or the other of the add bars 11 and 12. Obviously, such factor is also printed on the tape 14, as for example, indicated at 28 (Fig. 14) and the keyboard automatically cleared. The divisor is now entered into the keyboard in its proper decimal relationship relative to the dividend and a divisor entry key 30 is depressed, which effects transfer of the divisor into the multiplicand-divisor storage unit 35 and printing of the divisor at 31. Now, the handle 23 is moved laterally and normally to the left of its initial illustrated position until the divisor factor carried by the storage unit is properly aligned with the dividend registered on the accumulator. Thereupon, the handle 23 is rocked forward, toward the operator, to cause subtractive cyling of the machine. Such cycling will continue (providing the handle is held forward) until the remainder for that denomination reaches a value lower than that of the divisor, at which time the machine automatically stops, indicating an overdrafted condition. The handle is thereafter rocked rearwardly to effect a single additive corrective cycle and is then shifted one denominational position to the right, and the foregoing procedure repeated. The net number of cycles performed in each denominational position of the handle 23 is registered on the counter 25 in proper decimal relationship, thus indicating the result or quotient.

Figure 14:
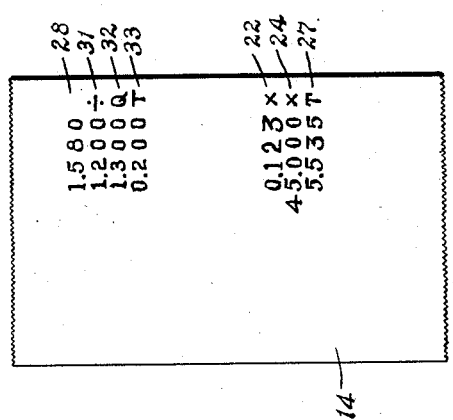
Fig. 14 is a view of a sample tape having recorded thereon the factors and results of different types of computation performed by the machine.

In order to record the quotient and clear the machine for subsequent calculation, the multiply-quotient key 26 is depressed, clearing the counter 25 and printing the amount, i. e., quotient, on the tape as indicated at 32 (Fig. 14). The remainder now remaining in the machine accumulator is printed as a 33 and the accumulator cleared automatically.

Keyboard

The keyboard, including the amount keys 10 (Figs. 1, 2 and 5) is of the flexible type, and each amount key when depressed serves as a stop to limit movement of an aligned drive rack 34 which is effective, depending upon the type of calculation, to drive an associated element of the accumulator 13 to enter an amount therein corresponding to the differential movement of the rack, to set the printing mechanism to print such amount, and to set an aligned one of a series of multiplicand-divisor storage-gears 35.

The keyboard is divided into a plurality of rows of amount keys ranging in value from 1 to 9 and each key comprises a numbered key top 36 integral with a key stem 37. The latter key stems are guided for vertical movement in aligned slots formed in a top plate 38 and a bottom plate 39, the latter plates being suitably secured together, and to machine frame plates.

The keys in each row are yieldably pressed upward by a tension spring 40 extending the length of the keyboard and suitably attached at opposite ends to the key plate 38. Each spring 40 rests on cross ribs 41 formed across slots 42 in the key plate and also extends through openings in the various key stems. Upon depression of a key, the adjacent portions of the associated spring 40 are stretched and extend through a slot 42.

Each key, when depressed, is latched in blocking position by a locking bail 43 pivoted at opposite ends thereof on the vertical walls of the key plate 39 by trunnion bearings 44 and 45 (Figs. 2 and 5). For this purpose, each key stem has a cam lobe (not shown) formed thereon which, when the key is depressed, rocks the locking bail 43 laterally against the action of a spring 46 extending between the top of each bail and the bottom of its adjacent bail. As the key reaches the bottom of its stroke the spring 46 returns the bail to a position over the top of the cam lobe, thereby latching the same.

The key stems 37 cooperate with respective ones of a series of shoulders 47 formed on the aligned racks 34 to control differential positioning of the latter. The various shoulders 47 are spaced apart distances slightly greater than the distances between the stems 37 so that depression of any key will permit forward movement of the associated rack 34 a number of increments equal to the value of such depressed key.

A zero block 48 extends downwardly from each of the locking bails 43, and when no key in the associated order is depressed, the bail 43 of that row will be spring held in an extreme inwardly rocked position wherein the zero block 48 lies directly in front of one of the shoulders 47 of the aligned rack, thereby preventing a substantial forward movement of this rack during subsequent operation of the machine. However, upon depression of a key, the locking bail will be held outward thereby sufficiently to retain the zero block 48 out of cooperative relation with its associated rack.

Referring in particular to Figs. 9 and 10, the stems of the various control bars such as 15, 16, 18 and 20, and excepting keys 21, 26 and 30, are also slidably mounted in aligned slots formed in the key frame plates 38 and 39.

Drive

Figure 13:
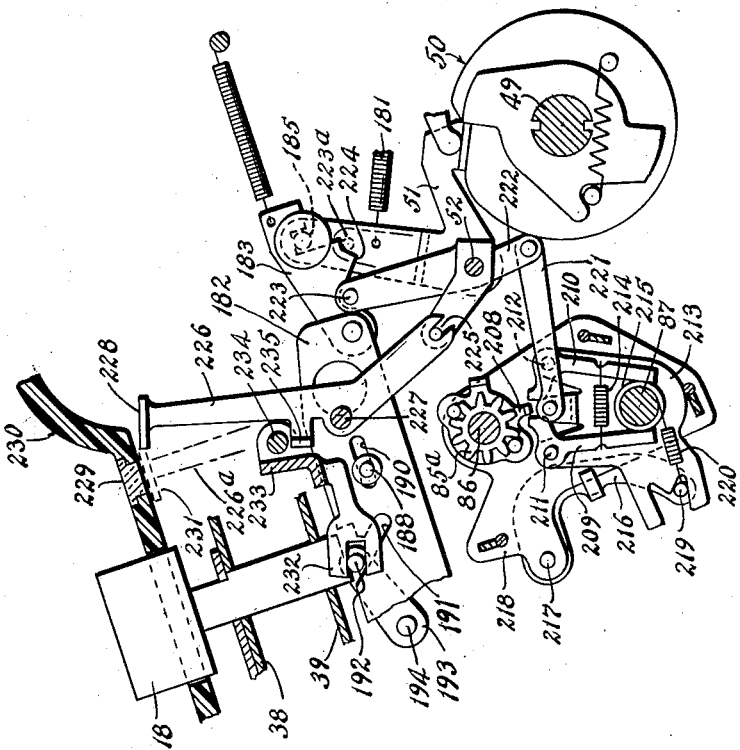
Fig. 13 is a fragmentary side elevational view illustrating the overdraft controls for arresting operation of the machine.

The various units of the machine are driven by a rotatable drive shaft 49 (Figs. 6, 7, 8, 11, 13, 16, 22, 25, 26, 31 and 36) from an electric motor (not shown) under control of a cyclically operable clutch generally indicated at 50 (Figs. 9 and 13). The driven side of the clutch is attached to the shaft 49 and the clutch is controlled by a clutch dog 51 pivoted on a frame pin 52 and arranged to effect engagement of the clutch upon counter-clockwise movement thereof away from the clutch. Disengagement of the clutch is effected by rocking the dog 51 clockwise into the position illustrated in Fig. 9.

Means are provided for yieldably transmitting a reciprocating motion to the various drive racks 34 from the shaft 49 during rotation of the latter. Referring to Fig. 8, a pair of juxtaposed complementary drive cams 52 and 53 are keyed on the shaft and cooperate with respective ones of a pair of rollers 54 and 55 mounted on a cam follower 56. The latter is pivoted on a stationary shaft 57 and is connected by a link 58 (see also Fig. 7) to an arm 59 suitably fastened on a rock shaft 60. A similar arm 61 (Fig. 2) is also fastened on the shaft 60 on the opposite side in the machine and both arms are bifurcated to embrace a rack drive shaft 62 mounted for fore and aft movement in an elongated slot formed in each of the machine side frames 172 and 173, one slot being shown at 63.

Referring to Fig. 2, each of the various drive racks 34 is supported at its forward end by the drive shaft 62, the latter being slidably embraced by a slot 65 in the rack. The rear end of each of the racks is provided with an elongated slot 66 (Fig. 5) which embraces the stationary shaft 57.

The slot 65 in each of the racks terminates at its closed end in opposed notches 67 normally engaged by rollers 68 carried by drive elements 69. The latter are rockably fitted in circumferential grooves formed in the shaft 62 and the adjacent drive elements 69 associated with each rack are spring urged in opposite directions by a tension spring 70 extending between the tails of the two elements to resiliently hold the rollers in the notches, thus forming a yieldable connection between the shaft 62 and the respective drive racks 34.

When, during forward movement of the shaft 62, as occurs during the first half of a machine cycle, each of the drive racks 34 is arrested due to striking against a depressed key stem or the associated zero block 48 or engagement of a "nines" stop shoulder 71 against a locking bail 72, the rollers 68 will ride out of the associated notches 67, thereby breaking the connection between the shaft 62 and the rack 34. The rollers will thereafter merely ride along the edges of the slot 65.

The racks 34 are returned to their zero or home positions during the latter half of each machine cycle by the cams 52 and 53, and means are provided for locking all of the various racks 34 in their zero positions at the completion of the machine cycle, as well as in their forwardly advanced positions during the midpoint or printing phase of a machine cycle. For this purpose, a series of notches 73 (Figs. 2 and 7) are formed on the under forward edge of each of the racks 34 and are spaced apart distances equal to the different increments of movement of the racks. The various notches are adapted to be engaged by the locking bail 72 after both the forward and return movements of the racks. For this purpose, the bail 72 is pivoted at opposite ends on frame pins 74 (Figs. 2 and 7). A clearance slot 75 is provided in the right hand side frame 173 of the machine whereby a pin 77 may connect the bail 72 with an arm 78 pivoted upon one of the frame pins 74. The arm 78 is connected by a link 79 to a cam follower 80. The latter is pivoted on the stationary shaft 57 and is provided with rollers 81 and 82 which cooperate with respective ones of a pair of complementary drive cams 83 and 84 keyed in juxtaposition with each other on the drive shaft 49.

*Accumulator*

The details of the accumulator unit are not pertinent to the present invention and thus they are omitted herein. However, reference may be had to said Drake Patent No. 2,472,696 for the details of an accumulator applicable to the machine.

The accumulator unit comprises a series of denominationally arranged ten tooth accumulator gears 85 (Figs. 5 and 13) independently and rotatably mounted on an accumulator shaft 86.

The shaft 86 and a second shaft 87, also forming part of the accumulator, are guided at opposite ends thereof in vertical slots 88 and 89, respectively (Fig. 15), formed in plates, one of which is shown at 90, suitably secured, in a manner not shown, to the machine frame plates.

Means are provided for raising and lowering the accumulator unit for the purpose of engaging the various accumulator gears 85 with either upper rack gear sections 91 or lower rack gear sections 92 formed on the drive racks 34. That is, during an additive operation, the accumulator is raised to mesh the accumulator gears 85 with the upper rack sections 91 so that during forward movement of the racks the gears will be rotated in a counter-clockwise direction, while during a subtractive operation the accumulator is lowered to mesh the gears 85 with the lower rack gear sections 92 to effect a clockwise rotation of the gears during forward movement of the racks.

For the purpose of raising and lowering the accumulator unit in accordance with the type of operation to be performed, a box cam, one of which is shown at 93 (Fig. 15) is provided at each side of the machine and is pivoted on a frame stud 94. Each cam is provided with a cam slot 95 which embraces a roller 96 mounted on the respective end of the accumulator shaft 86. Clockwise rocking movement of the cam 93 from its illustrated neutral position will raise the accumulator into its additive position, whereas counterclockwise rocking of the cam will lower the accumulator to its subtractive position, as will become more fully apparent hereinafter.

*Printer*

The various values registered on the racks 34 during either item entry or totalling operations are printed on the paper tape 14 (Figs. 1 and 5) which is fed from a supply roll 97, over a pressure roll 98, and around a rotatable platen 99 to a printing station where the values are printed thereon.

The printer comprises a series of numeral printing dials or wheels 100, one entrained with each drive rack 34. Each dial has a series of type 101 thereon ranging in value from zero to 9, and these dials are so connected to their associated racks that they will print a digit corresponding to the value of a key depressed in the associated order or to the numerical position to which the rack is moved in its forward stroke in either item entry or totalling operations.

Each printing wheel 100 is rotatably mounted on an individual lever 102 which is loosely keyed on a printer control shaft 103 and is spring urged clockwise toward the platen 99 by an individual tension spring 104. A gear 105 fixed to each printing dial meshes with an associated gear 106 also rotatably mounted on each lever 102. Except during printing operations, the levers 102 are held by the shaft 103 in their positions illustrated in Fig. 5, wherein the gears 106 mesh with idler gears 107 independently and rotatably mounted on a fixed shaft 108. The latter idlers are continuously entrained with respective ones of the drive racks 34 through auxiliary offset rack sections 109 (Figs. 5 and 6) which are attached continuations of the various racks 34. As indicated in Fig. 6, the rack sections 109 overlap each other vertically to provide clearance for independent movement.

The printer control shaft 103 is controlled by a printer cam 110 (Fig. 33) keyed on the aforementioned drive shaft 49. The cam 110 engages a roller 111 mounted on a cam follower assembly 112 which is fulcrumed on the stationary shaft 57 and is provided with a camming surface 113 engaged by roller 114 on an arm 115 fixed to the shaft 103. A tension spring 116, along with the various springs 104, holds the cam follower 112 in engagement with the cam 110. However, during the printing phase which occurs at approximately mid cycle, and after the racks have registered the printing wheels 100, a low space 110a of the cam 110 allows the shaft 103 to rock clockwise, thereby allowing all levers 102 which are otherwise allowed to do so, to force the printing wheels 100 into contact with a printing ribbon 117 and into contact with the paper tape 14 as it passes over the platen 99.

Means are provided to prevent printing of zeros to the left of the highermost significant digit in a value being printed. For this purpose a latch 118 is provided adjacent each printing lever 102 and is journalled on a stationary rod 119 extending through arcuate slots 120 formed in the various gears 107. The latches 118 are urged clockwise by tension springs 121 and are provided with ears 122 adapted to overlie tails 123 extending from the various printing levers 102.

Ears 124 are also formed on the latches 118 and are adapted, when the associated rack 34 and entrained gears are in their zero positions illustrated in Fig. 5, to each engage an enlarged arcuate section 125 of the slot 120 on the associated idler gear 107. The radius of the section 125 is such as to allow the latch to position its ear 122 in blocking relation to the tail 123 of the aligned lever 102, preventing the latter from being rocked into printing contact with the paper during a printing operation. However, when any idler gear 107 is rotated to its "1" or any other digit position, the ear 124 will rest on the smaller arcuate portion 126 in its associated idler gear, thereby blocking the respective latch 102 from moving inward into blocking relation with its printing lever 102.

Means are provided for rocking the various latches 118 counterclockwise of their positions illustrated in Fig. 5 at the beginning of a cycle and preparatory to forward movement of the racks 34 so that the arcuate portions 126 can pass under the ears 124 of latches 118. For this purpose, a bail 126 extends across the various latches and is suspended from a stationary cross rod 127. The bail is provided with a cross rod 128 extending through triangular openings in the various latches 118.

The bail 126 also forms an aligner for the various idler gears 107, and for this purpose normally engages between two teeth of the latter, as shown in Fig. 5. The bail is normally urged clockwise, away from engagement with the gears 107, by a tension spring 129, but is controlled by the aforementioned cams 83 and 84 (Fig. 7) through an arm 130 pivotally supported on a frame pin 131 and coupled through a pin and slot arrangement 132 to the aforementioned link 79. The upper end of the arm 130 engages one end of the cross rod 128 to normally hold the bail 126 in an inwardly rocked position, as shown, against the action of the spring 129, where it engages the idlers 107. However, during a cycle and when the racks are both advanced and retracted, the arm 130 is rocked counterclockwise, permitting spring 129 to withdraw the bail 126, thereby picking up the various latches 118 to remove their ears 124 from engagement with the inner edges of the slots 125 so that the gears 107 will be free to turn and the ears 122 will be removed from constraining the tails 123.

In order to permit printing of zeros to the right of the highermost significant digit being printed, each of the latch levers 118 is provided with an ear 133 overlapping the corresponding ear of the next latch lever to the left, i. e., the latch lever in the next higher denominational order. Therefore, when any latch lever is held outwardly by engagement with the surface 120 of its associated gear 107, all similar latch levers to the right thereof will likewise be held outwardly, permitting printing of zeros as well as significant digits in such lower orders.

In order to advance the paper 14, the platen 99 is normally advanced one increment during each machine cycle. For this purpose, a ratchet 134 (Figs. 37 and 38) is suitably secured to the shaft 135 of the platen, and is arranged to be advanced by a pawl 136 pivoted by a pin 137 at the lower end thereof to a cam follower 139. The latter is pivoted on the aforementioned shaft 57 and has a roller 140 thereon contacting a combined paper and ribbon feeding cam 141, the latter being keyed on the main drive shaft 49.

A spring 142 tensioned between a lug 143 near the lower end of the pawl 136 and a lever 144 normally maintain the pawl in its upper position illustrated in Figs. 37 and 38 and also in its counterclockwise rocked position wherein it rides against a guide pin 154 fixed to the lever 144 so that the pawl will be in a position to engage and advance the ratchet wheel 134 one increment.

The lever 144 is journaled upon a frame pin 146 and means (not shown) are provided for rocking the lever counterclockwise during totalling operations, thereby shifting the pin 145 to the left (Fig. 38), whereupon the upper end of the pawl 136 will be urged by the spring 142 to the left so as to permit the pawl to engage and advance the ratchet wheel 134 a plurality of increments.

Although the mechanism for advancing the ribbon 14 (Fig. 5) lengthwise of the platen 99 is not disclosed herein, such mechanism is operatively driven by a shaft 147 to which is attached a ratchet 148 cooperating with a pawl 149 pivotally mounted at 150 on the cam follower 139 and urged downwardly into engagement with the ratchet 148 by a spring 151 attached to a frame pin 152.

The cam follower 139 is additionally urged against the cam 141 by a spring 153. Thus, during each cycle of the machine, the cam 141 will be effective to normally operate the pawls 136 and 149 to advance their respective ratchet wheels 134 and 148.

Symbol printer

Means are provided to properly identify the various factors and results of different calculations recorded on the tape 14 as indicated in Fig. 14. For this purpose, a symbol printing section is provided in the printer mechanism hereinbefore described, such section including a printing wheel similar to the wheels 100 but having symbol type located around the periphery thereof as indicated in Fig. 11. The symbol wheel or dial is located directly to the right of the lowermost denomination numeral dial.

The symbol dial is carried by a printing lever similar to the lever 102 (Fig. 5) and is entrained through gears (not shown), similar to the gears 105, 106, with a gear 154 (Figs. 6, 10 and 12). The latter is continuously entrained with a special symbol rack 155, located at the left-hand side of the machine, through a pair of pinions 156 and 157 fixed to opposite ends of a shaft 158. The rack 155 is mounted for longitudinal fore and aft movement on a guide pin 159 and the shaft 57, which are respectively embraced by slots 160 and 161 formed in the rack.

The symbol rack 155 is yieldably advanced along with the denominational drive racks 34 by the aforementioned drive shaft 62. However, the yield in the symbol rack drive connection differs from that of the other racks and is provided by an arm 162 pivoted on the symbol rack at 163 and urged upwardly by a spring 164 tensioned between the arm and the rack, thereby normally maintaining a notch 165 formed in the arm in engagement with the shaft 62.

The rack 155 is provided with a series of stop shoulders 166 cooperable with respective ones of hereinafter described pins 192 associated with the several machine control bars 15, 16, 18 and 20. The shoulders associated with the control bars 18 and 20 are carried by a slide 168 mounted on the rack 155, but for the purposes of the present disclosure, the slide may be considered as part of the rack. The shoulders 166 are so spaced relative to their associated pins 192 as to enable the rack to differentially advance for a definite number of increments determined by the particular bar depressed, thereby causing the appropriate symbol type on the symbol printing wheel to be registered for printing.

Means are also provided for printing other appropriate symbols upon the depression of either the multiplicand entry key 21, the product-quotient key 26, and the divisor entry key 30. For this purpose, the symbol rack 155 is limited in its outward movement by engagement against a bar 169 associated with the latter three keys (Figs. 10, 16 and 17). The bar 169 is slidably suspended for lateral movement in the machine in slots 170 and 171, provided in the machine side frames 172 and 173, respectively.

Depression of the divisor entry key (Fig. 24) will cause a shoulder 30' on the stem of the key to cam against the beveled end 174 of the bar 169 until the bar has moved to the dotted line position 169a of Fig. 16 and the shoulder 30' of the key 30 has closed over the end of the bar 169 as illustrated in Fig. 17, thereby placing a depending lug 175 of the bar 169 in the path of a shoulder 176 provided upon a stepped extension 177 of the symbol rack 155. When the shoulder 176 is limited by the lug 175, the symbol will be limited in a position to locate the symbol dial at the division symbol "÷" printing position.

Depression of the multiplicand entry key 21 will release the divisor entry key 30 (which has been latched down as will hereinafter be explained) and the bar 169 will return to the full line position of Fig. 16 by reason of a spring 178 until a portion 175a of the bar 169 to the left of the lug 175 will be in the path of a shoulder 179 provided on the extension 177 of the symbol rack 155, thereby setting the symbol dial in a common multiplicand-multiplier symbol "×" printing position.

Depression of the quotient key 26 (Figs. 16, 17 and 18) during a division operation will cause a shoulder 26a thereon to lower the left-hand end of the bar 169 against the action of a tension spring 600, as illustrated in Fig. 17. This is so because the latter has previously been moved to the dotted line position 169a of Fig. 16 as above described (due to the currently depressed condition of the divisor entry key 30), and the lug 175 will be lowered into a position in front of a shoulder 180 on the symbol rack 155, thereby arresting the symbol rack in a position to locate the symbol dial in the quotient symbol "Q" printing position. The machine will then automatically continue to cycle to eventually also print a total or remainder symbol "T" as will be hereinafter described.

Clutch controls

Operation of the machine and engagement of the clutch 50 (Figs. 9 and 13) is effected by depressing any of the various machine control bars and keys as well as by rocking of the multiply-divide handle 23 fore or aft of the machine. Normally, the machine will continue to cycle as long as the control bar, key or handle is held in actuated position. However, upon an overdraft of the accumulator in one direction or another, the clutch will be automatically disengaged, even though the clutch control bar or handle be held in actuated position.

Referring in particular to Fig. 9, the aforementioned clutch control dog 51 is normally urged clockwise toward its illustrated clutch disengaging position by a tension spring 181. The clutch dog is normally coupled to a clutch control bar 182 by a hook member 183 pivoted to the control bar at 184. The hook member has a notch normally held in embracement with a pin 185 on the clutch dog by a tension spring 186 extending between the hook and a frame pin 187.

The clutch control bar 182 is supported for longitudinal movement by a pair of frame pins 188 and 189 embraced by elongated slots 190 in the bar.

The control bar 182 has four inclined cam slots 191 formed therein, each of which underlies a pin 192 carried on a lever 193, pivoted on a frame pin 194, and urged upwardly by a spring 195 extending from a suitable frame pin (not shown) and the pin 192. The pins 192 underlie the minus, nonadd, subtotal and total keys 15, 16, 20 and 18, respectively. Therefore, depression of any of these bars will likewise depress its associated pin 192 to cam the control bar 182 forwardly against the action of the spring 186, and thus, through the hook 183, rock the clutch control dog 51 counterclockwise to cause engagement of the clutch 50.

Provision is also made to effect engagement of the clutch upon depression of the add bar 11. As shown in Fig. 2, the stem of add bar 11 is connected by a pin and slot connection 196 to a lever 197 clamped to a rock shaft 198 which extends across the machine and is pivoted in the machine side frames. Another lever 199 (Fig. 9) is fixed to the shaft 198 and carries a roller 200, the latter coacting with a camming surface 201 formed on the forward end of the clutch control bar 182 so as to cam the latter bar forwardly upon depression of the add bar.

The clutch control bar is also actuated by depression of the control bars 21, 26 and 30, associated with the multiply-divide mechanism, and by actuation of the multiply-divide handle 23, as will appear hereinafter.

Actuation of the clutch dog will also effect closing of a normally open motor switch, generally indicated at 202, connected in the power circuit for the machine motor. A switch control lever 203 is pivoted on a frame pin 204 and overlies an ear 205 on the clutch dog 51. As the latter dog is rocked counterclockwise to permit engagement of the clutch 50, its ear 205 will rock the lever 203 against the action of its tension spring 206 to permit a switch plunger 207 to move downwardly, and thereby, in a manner not shown, close the motor circuit.

For the purpose of automatically causing disengagement of the clutch 50 upon an overdraft of the accumulator in either direction, the accumulator gear 85a (Fig. 13) located in the highest denominational order of the machine, is provided with a laterally extending ear 208 which cooperates with a pair of by-pass pawls 209 and 210. The latter are pivotally supported at 211 and 212, respectively, on a plate 213 which is freely pivoted on the lower accumulator shaft 87. A tension spring 214 extends between the tails of pawls 209 and 210 to normally hold the same in contact with a hub 215 of the plate 213.

The plate 213 is yieldably held in either of two rocked positions by a detent 216 pivoted at 217 on an associated accumulator brace plate 218. A pin 219 on the lower end of the detent is held in engagement with one or the other of two detenting notches in the plate 213 by a tension spring 220 extending between the shaft 87 and the pin 219.

The plate 213 is connected by a link 221 to the lower end of a lever 222. The latter is fulcrumed on the aforementioned pin 52 and is provided with a camming stud 223 which coacts with a camming surface 224 formed on the coupling hook 183. An additional arm of lever 222 is connected through a pin and slot coupling 225 to an indicator lever 226 pivoted on a frame pin 227. The upper end of the lever 226 is provided with a flag extension 228 movable into and out of position in line with a window 229 mounted in the machine cover 230.

The accumulator plate 213 and indicator lever 226 are illustrated in the normal positive condition of the accumulator with the gear 85a registering zero. It will be recalled that in additive operations the accumulator gears are rotated counterclockwise, whereas in subtractive operations the gears are rotated clockwise. Thus, as amounts are added into the accumulator and the capacity of the latter is exceeded, resulting in counterclockwise rotation of the highermost denominational accumulator gear 85a, the ear 208 carried thereby will merely wipe over the top edge of the pawl 209, rocking this pawl clockwise against the action of its spring 214 without affecting the position of the plate 213 and entrained linkage. However, in the event that amounts subtracted from the accumulator exceed positive amounts registered therein, the accumulator gear 85a will be rotated clockwise beyond its position shown in Fig. 13, causing the ear 208 to strike the rear edge of pawl 209, rocking the plate 213 counterclockwise about shaft 87 to its alternate position. In doing so, the link 221 will be drawn forward, rocking the lever 222 and causing its stud 223 to cam the hook 183 upward, thus releasing the clutch dog 51 so that it may return under the action of its spring 181 to clutch disengaging condition, even though the clutch control bar or handle is held in actuating position. Simultaneously, the indicator lever 226 will be rocked to position its flag extension 228 in overdraft indicating position, as shown by the broken lines 231. The lever 222 will now have been positioned to locate its pin 223 beyond the camming surface 224 into the broken line position 223a. Thus, the hook member 183 may be again spring moved into coupled relation with the clutch dog 51 as soon as the control bar or handle is returned from actuating position so as to permit return of the clutch bar to initial position.

In the event that the accumulator is overdrafted from its above-described negative condition to its normal positive condition, the accumulator gear 85a is rotated counterclockwise, causing the ear 208 to strike the forward end of by-pass pawl 210. This will rock the plate 213 back to its position shown in Fig. 13 so as to return the pin 223 from its broken line position 223a to its full line position. Therefore, the pin 223 will again cam the hook member 183 upawrd to release the clutch dog 51 to effect clutch disengagement.

Means are provided for returning the plate 213, indicator lever 226, etc., to their normal illustrated positions as an incident to a total taking operation, and in the event the accumulator is in a negative overdrafted condition. For this purpose, the pin 192 (Fig. 13) associated with the total key 18 is embraced by a bifurcated extension 232 of a bail 233 pivoted on frame pins, one of which is shown at 234, and having a portion thereof located directly in front of an ear 235 extending from the indicator lever 226. Thus, depression of the total bar 18 will rock the bail 233 counterclockwise and directly return the lever 226 from its overdraft indicating position 226a, and therewith return the remaining entrained linkage, including plate 213, to its position shown in Fig. 13.

Accumulator controls

As mentioned heretofore, the accumulator is raised or lowered from its neutral position shown in Fig. 5 into mesh with upper or lower rack sections 91 and 92 of the various drive racks 34, depending on whether additive or subtractive and totalling operations are to be made. For this purpose, mechanism is provided under control of the multiply-divide handle 23 and the various control bars, with the exception of the keys 21 and 30, to position the accumulator. The box cams, one of which is shown at 93 (Fig. 15) each carries two pins 235 and 236 located on opposite sides of the pivot pin 94. These pins are adapted to be selectively engaged by a hook member 237 pivotally connected at its rear end at 238 to a three-arm cam follower 239 pivoted on the shaft 57. The cam follower is urged counterclockwise by a tension spring 240 to press a roller 241 on a depending arm thereof against a cam 242 keyed on the drive shaft 49.

The cam 242 has a high portion extending over substantially half of its periphery whereby to rock the cam follower 239 and thereby normally position the hook member rearwardly during approximately the first half of a machine cycle.

Normally, when the machine is at rest, and during additive operations, such as addition and multiplication, the hook member 237 is raised by a tension spring 243 into its position shown, wherein a slot in the upper edge thereof engages the pin 235 so that as the hook member is moved rearwardly, it will rock the box cam 93 clockwise, to raise the accumulator into its additive position. Such action will occur prior to forward movement of the racks.

Means are provided under control of certain of the control bars and the multiply-divide handle 23 (when rocked forwardly) for locating the hook member 237 in lowermost position to effect subtractive entries into the accumulator. For this purpose, a control bar 244 is provided, being supported for sliding longitudinal movement by reason of slots 245 in the bar embracing rollers 246 journalled upon pins 194. The bar 244 is provided with four inclined camming surfaces 247 underlying the aforementioned depressible pins 192 associated with the control bars 15, 16, 18 and 20 (Figs. 1 and 9).

The bar 244 has a pin and slot connection 248 with a bell crank 249 which is fulcrumed on a frame pin 250 and is provided with roller 251 embraced by an elongated slot formed in the hook member 237. The camming surfaces 247 on bar 244 are so arranged that upon depression of the minus bar 15, total bar 18, or the subtotal bar 20, the control bar will be moved forwardly to its fullest extent which will be effective through the bell crank 249 to lower the hook member 237 into embracing engagement with the pin 236 so that subsequent rearward movement of the hook member will rock the box cam 93 counterclockwise and thereby lower the accumulator into its subtractive position relative to the racks.

The contour of the camming surface 247 underlying pin 192 associated with the nonadd bar 16 is such that depression of this bar will move the control bar 244 only half-way through its forward stroke so that the hook member 237 will be located in an intermediate position wherein it will not engage either of the pins 235 and 236. Consequently, the hook member will be ineffective to rock the cam 93 from its neutral illustrated position during operation of the machine.

During adding or subtracting operations, and after the high portion of the cam 242 has passed the roller 241, the spring 240 will become effective to return the hook 237 and consequently the cam 93 and the accumulator to their neutral positions before return of the racks from their forwardly advanced positions.

In order to maintain the box cam 93 in its illustrated neutral position when so located, a centralizer lever 245a is provided, being pivoted on a frame pin 246a and urged clockwise by a tension spring 247a to maintain a roller thereon in engagement with a notch 248a formed or the lower edge of the cam.

In totalling operations, the accumulator is returned to zero during the first part of a machine cycle and is then placed in neutral position in the same manner as in normal adding and subtracting operations. However, in subtotalling operations, the accumulator is returned to zero during the first part of a cycle and is then reset at its former accumulated value during the latter part of the cycle, i. e., during return of the racks. Therefore, it is necessary in the latter type of operation to maintain the accumulator in mesh with the racks during both forward and return strokes of the latter. To this end a second cam 249a having a high portion extending around the greater part of its periphery is keyed on the shaft 49 directly adjacent the cam 242. Cam 249a engages a roller 250a mounted on a cam follower 251a also pivoted on the shaft 57.

A slot 253 is formed in cam follower 251a, which slot is coextensive with a slot 252 in the cam follower 239. However, it will be noted that the portion of the follower 251a containing slot 253 extends rearwardly beyond the portion of cam follower 239 which contains the slot 252. A pin 254 carried by a link 255 rides within one or both of the slots 252 and 253, depending upon its position longitudinally of the machine.

The link 255 is normally held in rearward position by a tension spring 256 so as to locate the pin 254 solely within the slot 253. However, upon depression of the subtotal bar, the lever 193 associated therewith will be rocked clockwise, and a pin 257 carried by a depending leg thereof, and extending into an elongated slot 258 in the link 255 will pick up the latter and move the pin 254 forwardly into a location within both slots 252 and 253. In this condition, i. e., during a subtotaling operation, the two cam followers 239 and 251a will move as a unit and will therefore, through the hook member 237 and cam 93, hold the accumulator in mesh with the racks throughout the major portion of the cycle.

Means (not shown) are provided under control of both the total and subtotal keys 18 and 20 to release the amount keys 9 at the start of a totalling or subtotalling operation and to arrest the accumulator gears 85, 85a, etc., (Figs. 5 and 13) when the latter are returned by the racks to zero.

*Multiply-divide mechanism*

Referring to Figs. 2, 29 and 30, the multiply-divide mechanism comprises a series of multiplicand-divisor storage gears 35 spaced apart the same distance as the racks 34, and rotatably carried on a chain conveyor 259. The latter comprises a series of links 259' constructed as shown in Fig. 2a. Each link comprises side sections 260 and 261 connected by a web 262. Each link is pivotally connected to the next by a pin 263 having its ends slidably supported in channel grooves 264 formed in a pair of supporting rods 265 extending laterally across the machine near the forward end thereof. The rods 265 extend on opposite sides of the conveyor 259 and have their ends fixed in opposite upright portions 266 of a U-shaped vertically slidable frame 267 (Fig. 30). The ends of the pins 263 on leaving the ends of the grooves 264 are carried upon the periphery of a pair of wheels 268 having their trunnions 269 journalled in bearings 270 integral on opposite sides of the machine, with the uprights 266. The latter are each provided with pins 271 and 272 designed to support the frame 267 in respective slots 273 and 274 of the machine side frames 172 and 173. One of a pair of springs connecting the end links of the conveyor chain is shown at 275.

The conveyor 259 is normally positioned to maintain the storage gears in alignment with extensions 284 suitably secured to the various racks. By means of the handle 23, the conveyor 259 may be moved into any of various selected denominational positions wherein the storage gears may be lowered directly into the paths of the rack extensions. As will appear hereinafter, the storage gears may be rotated by the racks so as to register the multiplcand or divisor in multiplication or division calculations, respectively. On the other hand, the storage gears, having a value registered thereon, are utilized to differentially arrest the racks in corresponding digital positions during multiplication and division calculations. Thus, by proper manipulation of the handle 23 in multiplication problems, the multiplicand is successively entered, under control of the storage gears, into the accumulator through different groups of the racks in accordance with the multiplier value. In division, the divisor factor, having been registered in the storage gears, is repetitively and successively subtracted from the accumulator, utilizing the storage gears to differentially limit movement of the racks. The divisor will thus be repetitively subtracted from the dividend until an overdraft occurs, at which time the handle 23 is rocked to add the divisor factor back once into the accumulator. The handle is then shifted one denominational order to the right to locate the storage gears in alignment with the next lower echelon of racks and the above process repeated. The net number of cycles is registered on the corresponding order of the counter 25 so that either the multiplier factor in multiplication problems or the quotient in division problems will be registered by this counter.

As shown in Fig. 30 each storage gear 35 is provided with trunnions 276 journalled in spaced upstanding lugs 277 formed on the webs 262 of the various links 260. The lugs 277 are notched on their top edges at 278 to receive an endless belt-like tension spring 279 which acts as a detent for the gears 35. Each of the lugs 277 has an irregular slot 280 (Fig. 2a) formed in the web 262 for passage of the gear 35 and a zero stop 281 (Fig. 2) suitably attached to the gear. The slot 280 is extended at 282 to provide additional passage for the zero stop, but is foreshortened to provide a shoulder at 283 to limit the stop 281 at the zero position.

As hereinafter described, the bracket 267 supports the gears 35 slightly above rack extensions 284, thereby permitting the racks to move forward in straight addition or subtraction problems without engaging the gears 35, and also permitting the handle 23 to shift the gears 35 laterally of the machine without engaging the rack extensions. In multiplication or division the gears are lowered into engagement with the racks 284.

The multiply-divide handle 23 is mounted on a pin 285 suitably fixed to a sleeve 286 slidable upon a rock shaft 287 journalled in bearings provided in the machine side frames 172 and 173. A spring 288 loosely coiled about the shaft 287 between the sleeve 286 and the frame 172, and a spring 289 coiled about the rock shaft between the sleeve 286 and the frame 173, normally urge the handle 23 into the neutral position of Figs. 1 and 30. The pin 285 extends into a groove 290 formed longitudinally in the shaft 287, whereby the shaft may be rocked by the handle while permitting lateral movement of the handle relative to the shaft.

Means are provided to couple the conveyor 259 to the handle 23 whereby to move the former into different denominational positions relative to the rack extension 284. For this purpose, one of the links 260 is provided with an upstanding extension 291 bifurcated to embrace one leg of a yoke-like connector 292 (Fig. 29) in which the ends of the sleeve 286 are journalled (Fig. 30). One leg of the connector 292 is bifurcated to embrace a groove 293 formed in the hub 294 of a four-toothed counter actuator gear 295 which is slidably keyed on a counter actuator shaft 296. Thus, as the handle 23 is moved along the shaft 287 it will, through the connector 292, move the storage gear conveyor 259 and the actuator gear 295, thereby aligning the storage gears 35 in cooperative relation with different ones of the rack extension 284 and simultaneously aligning the actuator gear 295 into cooperative relation with different ones of a series of toothed and numeral bearing dials 297 comprising the multiplier-quotient counter 25.

A plate 298 extending laterally of the machine above the shaft 287 is provided with depending ears 299 whereby screws 300 may secure the plate to the side frames 172 and 173 (Fig. 2). The plate 298 is provided with a serrated slot 301 similar in shape and extent to a slot 302 provided in a cover 230 of the machine. Both the slot 301 and the slot 302 are provided with a series of notches 304 (Fig. 1) engageable by a roller 305 rotatably mounted on the handle pin 285 between the handle 23 and the sleeve 286. The notches 304 permit fore and aft rocking of the handle only when the latter is located in a denominational position to align the storage gears 35 with associated ones of the rack extensions 284 and to align the actuator gear 295 with the teeth of an aligned one of the counter dials 297.

In order to prevent foreign matter from entering the machine through the slots 301 and 302, a pair of relatively thin strips 306 of rubber or the like are attached beneath the plate 298 with their adjacent edges normally abutting each other along the center of the slots. The strips however are sufficiently flexible to permit unhampered lateral and rocking movement of the handle 23.

Means are provided whereby rocking of the handle 23 fore and aft of its neutral position, illustrated in full lines in Fig. 2, into its alternate positions, shown by the dotted lines 23a and 23b, will cause engagement of the clutch and appropriate positioning of the accumulator to add or subtract amounts therein, depending on the direction in which the handle is rocked.

Referring particularly to Figs. 15a and 27, the aforementioned rock shaft 287 has connected thereto, at the right hand side of the machine, an arm 307 having a pin and slot connection 308 with a yieldable link generally designated 309. The pin 308 is slidably mounted in a slot 310 provided in a hanger 311 suspended from the shafts 287 and 296. The link 309 is suspended at its other end by pins 312 and 313, respectively (Fig. 15) provided in the lower ends of an addition control link 314 and a subtraction control link 315. The pins 312 and 313 are respectively engageable by cam surfaces 316 and 317 formed on the lower edge of the link 309.

The link 314 is pivotally connected at its upper end by a pin 318 to an arm 319 attached to the aforementioned add control rock shaft 198, and the pin 318 has journalled thereon a roller 320 engageable with a cam surface 321 of a tongue-like extension of the control bar 244. The link 315 is pivotally connected at its upper end to a pin 192a carried by the lever 193 associated with the subtract key 15.

Therefore, rocking of the handle 23 to either of the dotted line positions of Fig. 2 will shift the link 309 forward or aft, causing its cam surface 316 or 317 to cam the respective link 314 or 315 downwardly to accordingly effect an add or subtract operation. The link 314 is guided in vertical movement by a frame pin 322 while link 315 is similarly guided by frame pin 323.

Since, as mentioned heretofore, the hook 237 is normally positioned to condition the accumulators for an add operation, the roller 320 will bypass the cam 321 and the accumulator positioning control bar 244 will remain unaffected in the above-described add operation.

On the other hand, rocking of the handle 23 forwardly to its broken line position 23b will correspondingly rock the arm 307 counterclockwise, causing the cam 317 of the link 309 to cam the link 315 downwardly, thereby causing the subtract lever pin 192a to cam the accumulator positioning control bar 244 forward to position the hook 237 in embracement with the pin 236 so that it will be effective to rock the cam 93 and thus lower the accumulator 13 into subtract relation with the racks 34. The pins 322 and 323 also prevent upward movement of the link 309.

Means are also provided for locking the machine in an additive and/or subtractive position throughout approximately the first half of a machine cycle initiated by the handle 23, the add bar 11 or the subtract bar 15.

Referring to Fig. 15, a link 324 is slidably supported at its forward end upon the frame pin 322 and at its rearward end upon a frame pin 322a. The link 324 is bifurcated near its forward end to provide a slot 326 and a depending lug 327, and is provided adjacent the pin 313 with a depending lug 328 formed to provide a slot 329. The link 324 has at its rear end a pin and slot connection 324a with the cam follower 239. Therefore, during an additive cycle initiated by either a rearward movement of the handle 23 or a depression of the add bar 11, the link 324 will be moved forward by the cam follower 239 at the same time that the latter positions the accumulator 13. Therefore, the lug 327 is moved over the pin 312, which has been lowered by the cam 316, to block return of the same. At this same time, the slot 329 embraces and locks the pin 313 in its upward or inoperative position. Thus, the machine will be locked in its additive condition until the roller 241 drops off the high portion of the cam 242 at approximately mid-cycle, at which time the accumulator 13 is also withdrawn from meshing engagement with the racks 34.

Vice versa, during a subtractive cycle initiated by forward movement of the handle 23 or depression of the subtract bar 15, the link 324 will move forward to lock the pin 313 beneath the lug 328 and the slot 326 will embrace and lock the pin 312 in an inoperative position during approximately the first half of the machine cycle.

Now, because the accumulator is locked into engagement with the racks 34 during approximately the first half of the machine cycle, and the link 309 would normally be held from moving beyond its central position by engagement with the locked pins 312 and 313, and in order to facilitate control of the machine by the operator at the highest possible rate of speed even while insuring the proper setting of the accumulator, certain yieldable parts are provided. In other words, the handle 23 may be rocked from one position to another at any time during a cycle without deleterious effect.

Means for this purpose include the aforementioned yieldable link 309 and a slide 334 carried by pins 335 secured to the accumulator positioning control bar 244. The pins 335 extend into slots 336 formed in the slide. A spring 337 is tensioned between the slide 334 and one of the pins 335 to normally maintain the elements in their relative positions illustrated in Fig. 15 wherein a camming surface 338 on the slide is located below the pin 192a on the lever 193 associated with the subtract key 15.

The link 309 is normally held to the length shown in Fig. 15a, but may be extended or contracted from this position, and for this purpose, is composed of two link parts 339 and 339a. Identical cut-out portions 340 are provided in each link part 339 and 339a forming a pair of tenons 341 and 342 extending inwardly toward each other. A compressible spring 343 is positioned over the tenons of both link parts to thereby hold the link 309 at its normal illustrated length.

Now, assuming that the handle 23 is rocked, in multiplication, to its rearward add position 23a, the spring 343 will not compress because the latter spring is unyielding enough to move the sections 339 and 339a of link 309 forwardly as a unit to thereby rock the add control shaft 198. The accumulator positioning control bar 244 is already in its rearward add position and thus the roller 320 will by-pass the cam surface 321, but the roller 200 (Fig. 9) will move the clutch bar 182 to engage the clutch and an additive machine cycle will ensue. Therefore, the bar 324 will lock the machine in add condition and will prevent depression of the subtract control link 315.

If, after the start of the above-described additive cycle, the handle 23 is rocked forward, as in division, to its subtractive position 23b before the first half of the additive cycle is completed, the cam 317 cannot force the pin 313 downwardly. Therefore, the spring 343 will be compressed, shortening the link 309 until the roller 241 drops back onto the low side of the cam 242. The bar 324 will then retract to release link 315, permitting the same to be pulled down by the now-released spring 343. The pin 192a will now be lowered to move the bar 244 forward until the hook 237 engages the pin 236 of the cam 93. However, the accumulator will remain in neutral because the roller 241 will still be riding on the low side of the cam 242 in the latter part of the additive cycle, but should the handle 23 continue to be held in its position 23b, the machine will immediately go into a subtractive cycle at the end of the additive cycle.

Now, if after the start of a subtractive cycle the handle 23 is rocked, as in multiplication, to its additive position 23a before the first half of the subtractive cycle is completed, the cam 316 cannot force the pin 312 downwardly. Therefore, the spring 343 will be compressed, thereby lengthening the link 309 until the roller 241 drops back onto the low side of the cam 242. The bar 324 will then withdraw the slot 326 from embracement with the pin 312, permitting the link 314 to be pulled down due to the released stored energy of the spring 343 and the resultant lengthening of the link 309, thus causing the roller 320 to cam against the camming surface 321 to move the bar 244 rearwardly until the hook 237 engages the pin 235. However, the accumulator will remain in neutral because the roller 241 will still be riding on the low side of the cam 242 in the latter part of the subtractive cycle. Should the handle 23 continue to be held in its position 23a, the machine will immediately go into the additive cycle at the end of the subtract cycle. When the accumulator positioning control bar 244 is pushed rearwardly by the roller 320 into the additive position while the pin 192a is still down in the subtractive position, the pins 335 will move rearwardly in the slots 336, a yielding action being provided in the expansion of the spring 337.

Since in multiplication and division calculations it is desirable to control the extent of movement of the racks 34 solely by the storage gears 35, means are provided for automatically releasing any amount keys which may have possibly been depressed prior to such multiplication and division calculations, and incidentally to hold the aforementioned key lock bails 43 (Figs. 2 and 5) in outwardly rocked positions against the action of their springs 46 so that the racks may freely move without interference by the zero blocks 48. For this purpose, the arm 307 (Fig. 27) is formed with a shallow concavity 330 in its lower arcuate shaped edge 331 which engages a roller 344 carried on one end of a lever 5 fulcrumed on a frame pin 346 and having a pin 347 fixed in its other end. This pin underlies a pawl-like link 348 pivoted at its forward end upon a pin 349 fixed to a lever 350 which is pivoted upon a frame pin 351. The lever 350 is also stabilized or guided by another frame pin 352 embraced by a slot 353 provided in the lever 350, which has its free end overlying a key release lever 354 forming part of the key release mechanism (not shown). Upon depression of the lever 354 by the lever 350, the former acts to rock all key lock bails 43 outwardly, removing the zero blocks 48 from positions blocking the racks 34 in their home positions.

Normally a spring 355 tensioned between the link 348 and a frame pin, holds the free end of the link out of engagement with a pin 325 on the cam follower 251a. However, upon rocking of the handle 23 from its full line neutral position into its add or subtract controlling position, the cam edge of the arm 307 will rock the lever 345, thereby causing the pin 347 to lift the free notched end of the link 348 into the path of the pin 325. Accordingly, as the cam follower 251a is rocked by the cam at the start of a machine cycle initiated by the handle 23, the pin 325 will force the link 348 to the left (Fig. 27), thereby rocking the lever 350 clockwise to depress the lever 354, thereby causing the release of any depressed amount keys 10, and release of all zero blocks 48 from blocking relationship with their respective racks 34.

The pin 349 also serves to rock the lever 350 to release the amount keys 10 whenever either the subtotal key 20 or the total key 18 is depressed. For this purpose, the pin 349 is embraced by a slot 356 in a link 357 pivotally connected at one end to a hook-like member 358 (Figs. 27 and 28) and to a vertical link 359. The pins 192—192 which underlie the stems of the keys 20 and 18 are pivoted in the opposed ends of a link 362, pivotally connected at its center by a pin 363 to the upper end of the link 359. The purpose of the hook 358 is to rock a plurality of zeroizing pawls 364 into the path of zero stops 365 carried by respective ones of the accumulator gears 85 as more fully described in the above-mentioned patents. Depression of the key 20 or the key 18 will depress the link 359, thereby rocking the hook 358 counterclockwise upon a frame pin 366 to lift a shoulder 367 of the hook into the path of the pin 325 carried by the cam follower 251a. It will be recalled that the latter is rocked clockwise, in the initial stage of a machine cycle, thereby moving the hook 358 to the left to rock an arm 370 connected thereto by a pin and slot connection 369. The arm is secured to a rock shaft 368 to which all of the zeroizing pawls are fastened. Rocking of the shaft will move the pawls 364 into the paths of zero stops 365 secured to the various accumulator gears 85 to thereby arrest the same in their zero positions during totalling and subtotalling operations.

To safeguard against the effect of any inadvertent depression of the amount keys after the handle 23 has been finally rocked, the stem of the key 26 is adapted to clear the keyboard by engaging a pin 344a fixed in the lever 345, Fig. 27.

*Multiplier-quotient counter*

The multiplier-quotient counter 25 (Figs. 1, 2, 29, 30 and 32) visible through windows 371 in the machine cover 230, comprises the aforementioned series of denominationally arranged dials 297 arranged to be selectively actuated by the actuator 295 according to the denominational position of the handle 23 and storage gear conveyor 35, as described hereinbefore. The various dials 297 are independently and rotatably mounted upon a counter shaft 372 extending through slots 373 (Figs. 18 and 24) in the side frames 172 and 173. Ten-toothed gears 374 are secured to the dials 297 and mesh with idler gears 375 independently rotatable upon an idler shaft 376. The latter gears mesh with gears 377 rotatable upon a shaft 378 and which are normally out of mesh with the aforementioned rack gear extensions 284 attached to aligned ones of the racks 34. The shaft 378 also extends through slots 379 in side frames 172 and 173. The shafts 372, 376 and 378 are all fixed in a pair of gear assembly frames 381 and 382. Spacers 380 are provided on all the shafts to separate the various gears.

Each counter dial 297 is detented by a pawl 383 engageable between the teeth of gears 375 and rockable upon the shaft 378. The pawls 383 are spring urged upward by a common coil spring 384 extending along the length of the shaft 376 and having its ends fixed to the plates 381 and 382. These plates are integrally joined and cross-braced by a web 385 (Fig. 31) serrated to form lugs 386 to support the spring 384 at spaced points and to form notches 387 wherein the spring may yield when thrust by the pawls as the gears 375 are rotated in either direction.

The shaft 378 has a link 388 (Fig. 18) fixed to its left-hand end and a link 389 (Fig. 24) fixed to its right-hand end. Each link is pivoted at 390, respectively, to a bell crank 391 and an arm 392. The bell crank 391 and the arm 392 and a bail 393 extending across the machine are all axially aligned and joined together to rock upon trunnions 394 pivoted in the side frames 172 and 173. A spring 395 extending between the bail 393 and a frame pin 396 urges the bail, bellcrank 391 and the arm 392 clockwise to normally hold the counter dial gears 297 and entrained gearing in their upper illustrated positions wherein the gears 377 are maintained out of mesh with the rack extensions 284.

As illustrated in Figs. 2 and 32, each of the dials 297 is provided with ten laterally extending teeth 397, one of which teeth 398 extends a greater distance than the rest, and is aligned with a zero stop lug 399 formed on a stationary cross frame member 400. This member extends across the machine and is suitably secured at its opposite ends to the machine side plates 172 and 173. Normally, however, the counter dials are located above the zero stop lugs 399 as shown in Fig. 2 and thus are not affected thereby.

In order to maintain the rack extensions 284 in alignment with the gears 377, a comb 401 extends across the machine and is suitably fastened at its ends to the side plates 172 and 173. The comb has slots therein to slidably receive the forward sections of the rack extensions.

*Counter actuator mechanism*

The counter actuator 295 (Figs. 2, 29 and 32) is rotated one-quarter revolution during each cycle while the machine is performing multiplication or division, whereby to advance an aligned dial 297 one increment in an appropriate direction. That is, during multiplication operations and when the handle 23 is rocked rearwardly to effect additive entries into the accumulator, the actuator is rotated clockwise, causing the selected counter dial to progress counter-clockwise from one numeral increment to the next higher numeral increment. However, when the handle is rocked forwardly to effect subtractive entries, such as would occur in negative multiplication, or in making corrections, the actuator is rotated counter-clockwise to retrogress its respective dial.

On the other hand, during division operations, when the handle 23 is rocked forwardly to effect subtractive entries into the accumulator, the actuator 295 is rotated clockwise to progress its dial counterclockwise, whereas, when the handle is rocked rearwardly during such division operations to effect additive entries, the actuator is rotated clockwise to retrogress its dial counterclockwise.

This reversal of the direction of rotation of the counter dials during multiplication and division problems is predetermined by the position of the division factor key 30 as an incident to entry of the multiplier or the division factors, as will appear hereinafter.

The means for intermittently rotating the actuator 295 includes a link 402 (Fig. 3) arranged to be reciprocated longitudinally and to be set in either of two positions above and below its neutral illustrated position. The link is reciprocated by a pin 403 secured to the arm 59 (Figs. 3 and 7). A slot 404 provided in the rear end of the link 42 engages the pin 403. The forward end of the link 402 is guided in its path of reciprocation by a slot 405 embracing a pair of pins 406 carried by a plate 407 hereinafter described.

A pair of actuating pawls 408 and 409 are pivotally mounted at one of their ends upon pins 410 and 411, respectively, secured in an upwardly extending portion 412 of the link 402, and a spring 413 is tensioned between the pawls to normally retain the same in their relative positions shown. The latter paawls are adapted to coact with four equally spaced pins 414 mounted on a pinwheel 415 (Figs. 3 and 39) attached to the right-hand end of the actuator shaft 296.

A centralizer 416 (Fig. 4) is provided to normally locate the pinwheel in its position illustrated in Figs. 4 and 39. The centralizer is pivoted upon the rock shaft 287 and is urged downwardly into engagement with two of the pins 414 by a tension spring 417.

The rock shaft 287 is reduced at its right-hand end to provide a pair of flat surfaces 418 which serve two purposes, namely, they provide clearance for rocking the shaft adjacent the key 30, and also provide a driving means for a lever 419 fixed to the end of the shaft. The latter lever is bifurcated to embrace a pin 420 carried on a lever 421 freely rockable upon the shaft 296. The lever 421 is bifurcated to embrace a pin 422 carried by one end of a plate 423 also freely rockable upon the shaft 296. The other end of the plate 423 carries a pin 424 engageable by a camming surface 425 provided on the lower end of a stem 426 of the divisor entry key 30. The key 30 is provided with two stems 426 and 427 as illustrated in Fig. 25.

Returning to Fig. 39, the plate 423 is provided with an elongated opening 428 slidably and rockably embracing the shaft 296. The plate 407 is bifurcated at its upper end to slidably embrace the shaft 296, and the two legs 429 and 430 of the bifurcation are respectively provided with channels 431 and 432 (see also Fig. 40) for respectively and selectively embracing the pins 424 and 422. A spring 433 connected between the pins 420 and 422 normally holds the latter pin in the channel 432.

In the normal arrangement of the parts, as in straight addition, (as shown in Figs. 3 and 39) and wherein the shaft 287 is retained in its neutral position and the divisor entry key 30 is in its raised position, movement of the link 402 forwardly from its illustrated position, in response to depression of an add bar or the like, will cause the pawl 408 to pass above the pinwheel 415, and the pawl 409 to pass beneath the pinwheel without either pawl engaging the pins 414. Thus, the counter will not be actuated. However, when the handle 23 is rocked rearwardly during an operation wherein the divisor entry key 30 is not deperssed, lever 419 will rock clockwise and through the pin 420 rock the lever 421 counterclockwise. The pin 422, coacting with channel 432, causes the plate 407 to be raised, guided by the shaft 296 and a frame pin 434 (Fig. 3) which is embraced by a bifurcated lower section of the plate. As the plate is moved upward, the pawl 409 will be aligned with the lower right-hand pin 414. Now, when the rack drive mechanism is actuated and the link 402 is moved forwardly, the pawl 409 will advance the pinwheel 415 to turn the dial 25 counterclockwise.

On the other hand, rocking of the handle 23 forwardly will, through the pin 422, lower the plate 407 to align the pawl 408 with an upper right-hand pin 414 to rotate the actuator counterclockwise to subtractively turn the dial 25 clockwise one increment.

Now, when the key 30 is depressed to set the machine for division calculations, the cam 425 of the key 30 will force the pin 424 into the channel 431 and the pin 422 out of the channel 432, but still allow the pin to remain between the bifurcation legs of the lever 421. Therefore, when the handle 23 is rocked rearwardly, the plate 407 will move reversely from the multiplication position in that the latter plate will now move downwardly to locate the pawl 408 in alignment with the upper right-hand pin 414 to effect a clockwise subtractive movement of the dial 25.

On the other hand, with the key 30 still down, rocking of the handle 23 forwardly will, through the pin 424, raise the plate 407 to align the pawl 409 with the lower right-hand pin 414 to rotate the actuator clockwise to additively turn the dial 25 counterclockwise.

*Multiplicand entry controls*

The multiplicand entry key 21 (Figs. 1 and 24) is effective, upon depression, to cause entry of a multiplicand factor from the amount keys 10 into the storage gears 35. The stem of the key is provided with slots 435 and 436 guided over frame pins 437 and 438, respectively. A spring 439 tensioned between the pin 438 and the lower end of the key stem normally holds the key in its illustrated raised position. A shoulder 440, provided on the stem of the key 21, is engageable beneath a lug 441 on a sliding latch 442 when the key is depressed. Means, to be described hereinafter, are provided to release the key 21 from its latched-down position near the end of the ensuing machine cycle.

A roller on a pin 443 fixed in the stem of the key 21 engages and lowers a link 444 when the key is depressed and the right-hand end of the link is provided with a slot 445 whereby the link is slidably pivoted upon the drive shaft 49. The link 444 is provided with rollers 446 and 447 adjacent cams 448 and 449, respectively, the latter cams being fixed on the drive shaft 49 whereby the link may be reciprocated fore and aft of the machine. The link 444 is formed into a hook 450 at its other end. When the key 21 is depressed, the hook embraces a pin 451 fixed in a three-armed lever 452 fixed upon the right-hand end of a shaft 453. The latter shaft extends laterally through the machine and has fixed to the other end thereof another three-armed lever 454 (Fig. 18) like the lever 452. The levers 452 and 454 each have a bifurcated arm embracing one of the pins 272 (see also Fig. 30) and the lever 454 also carries a pin 455 like the pin 451, the latter two pins being respectively engaged by latches 456 and 457 which are fixed on opposing ends of a lateral shaft 458 and are respectively urged upwardly by springs 459 and 460 to normally lock the levers 452 and 454 in their illustrated positions. It will be recalled that the pins 272 are carried by the frame 267 supporting the conveyor for the storage gears 35.

Thus, when the key 21 is depressed, the hook 450 engages the pin 451, and a pin 461 fixed in the hook disengages the latch 457 from the pin 451. Consequent rocking of the shaft 458 disengages the latch 456 from the pin 455. Also, the link 444, in lowering, rocks a nonadd control bail 462 counterclockwise upon frame pins 463 and 464.

A leg 465 of the bail 462 (Fig. 18) engages the aforementioned pin 248, thereby rocking the bellcrank 249 and the hook 237 (see also Fig. 15) into its nonadd position wherein the notches in the latter hook are disengaged from both pins 235 and 236 of the cam 93. Thus, the accumulator 13 will remain out of engagement with the racks 34 when the hook 237 is pulled rearwardly during the succeeding cycle.

The movement of the pin 248 also moves the accumulator positioning control bar 244 forward, and a shoulder 244a on the latter (Fig. 15) engages a pin 466 carried on a symbol rack latch 467 (Fig. 10) pivoted upon the pin 159, and is thereby effective to release the latch from blocking engagement with pin 163 on the aforementioned symbol control rack 155. Accordingly, the symbol rack is enabled to advance to its "X" position where it is arrested by the bar 169 in the aforesaid manner. The pin 466 engages a shoulder 468 (Fig. 9) of the clutch control bar 182 during counterclockwise rocking of the latch 467, thereby initiating a machine cycle by engaging the clutch 50.

As the machine cycles, the dwell portion of the cam 448 (Fig. 24) engages the roller 446, and holds the link 444 forward until the racks 34 have reached their most forward position, whereupon at approximately midcycle as indicated in Fig. 42, the cam 449, engaging the roller 447, immediately pulls the link rearwardly, rocking the levers 452 and 454 to lower the storage gears 35 into engagement with the rack extensions 284. Thus, as the racks return they will digitize the gears 35. Also, as the lever 452 rocks clockwise to lower the gears 35, a shoulder 469 of a dog 470, pivoted at 471 upon the latch 442, is pulled downwardly by a spring 472 behind a pin 473 fixed in the lever 452. As the racks 34, carrying the rack extensions 284 reach their returned rearward positions, the roller 447 drops down upon the low side of the cam 449, and the cam 448 by means of the roller 446, moves the link 444 and the lever 452 to their forward illustrated positions, causing the pin 473 to thrust against the shoulder 469 to move the latch 442 to the right until the lug 441 is removed from the shoulder 440 on the stem of the key 21, permitting the same to return to its normal position. As the key 21 moves upwardly the link 444 will follow it because the spring 460 is allowed to rock the latch 457 to rock the lever 452 into its normal position. At the same time the link 444, by means of the pin 461, raises a link 474 having a pin and slot connection 474a with the dog 470. Consequently, the dog is returned to its upper illustration position.

Divisor entry controls

The divisor entry key 30 (Figs. 1 and 24) is effective, upon depression, to cause entry of a divisor factor from the amount keys 10 into the storage gears 35. The key 30 is provided with elongated slots embracing frame pins 475 and 476 and is tensioned upwardly by a spring 477, all in a manner similar to that of the key 21. A shoulder 478, provided on the stem of the key 30 is engageable beneath a lug 479 on the latch 442 when the key is depressed. A roller on a pin 480 fixed in the key 30 overlies the link 444 and thus is effective to couple the same with the lever 452 in the same manner as when the key 21 is depressed as hereinbefore described. But the key 30 is also capable of engaging the pin 424 (Fig. 25) and the slide bar 169 as hereinbefore described. The latch 442 is slidably mounted upon the pins 438 and 476 and is effective to release the key 30 in the same manner as the key 21 is released.

Multiplier-quotient counter clearing controls

The multiplier-quotient key 26 (Figs. 1 and 18) is effective, upon depression thereof, to cause three consecutive machine cycles before the machine again stops, the cycles causing, respectively, the clearing of the counter 25 and recording the amount registered thereon upon the tape 14, the clearing or totalling of the accumulator 13 and recording the remainder, or the product, as the case may be, upon the tape 14, and the clearing of the storage gears 35 without recording the value registered thereon.

The key 26 is provided with slots, guided for vertical movement upon the shaft 296 and a frame pin 481, and is tensioned upwardly toward the position shown in Fig. 18 by a spring 482 connected between the shaft 296 and a pin 483 fixed in the stem of the key 26. A spring 484 is attached at one end to the stem of the key 26 and at the other end to a lug formed on a pawl 485 pivoted upon the pin 483. The latter pawl is thereby urged to a position overlying the forward end of a link 486 pivoted at its other end upon a pin 487 carried by another link 488 (see also Fig. 18a) similar in construction at its rear end to the link 444 (Fig. 24) in that it has a slot 489 providing for sliding and rocking of the link 488 upon the shaft 49. The link 488 is controlled in its longitudinal movements by cams 490 and 491, respectively, engaging rollers 492 and 493 mounted upon the link.

A lever bar 494 pivoted at its forward end upon the shaft 453 lies for a great part parallel to the links 486 and 488 and is connected at its rear end by a pin and slot connection 495 to the lower end of a vertical link 496. The latter is pivotally connected at its upper end to the aforementioned pin 192 associated with the total key 18.

After the aforementioned triple cycle movement is first initiated by the key 26 it is continued automatically by a star-like rotating control member generally designated 497 (see also Figs. 21, 22, 23 and 26) consisting of three two-ended control plates 1192, 1193 and 1194 which are fixed at their centers upon a common sleeve 498 journalled upon a shaft 499 having its two ends supported, respectively, in the side frame plate 172 and a bracket 500 suitably secured to the side frame plate. The plates each have two pins mounted on opposite ends thereof and all are located equidistant from the axis of the shaft 499. Plate 1192 carries pins 486a and 486b; plate 1193 carries pins 494a and 494b; and plate 1194 carries pins 488a and 488b.

In order to more easily identify the latter pins with the links under their control, the pins have been designated with a lower case letter in addition to the same number respectively identifying their associated links.

When the key 26 is depressed, the link 486 is depressed by means of the pawl 485, and a spring urged hook 501 pivoted upon the latter link at 502, and urged counterclockwise by a spring 502a extending between the pawl and the link, pulls upon a pin 486c carried by control plate 1192, thereby turning the control member 497 into the position shown in Fig. 21 wherein the pin 486a cams against the upper edge of the link 486 to hold the same in depressed position. In this position of the link a hook 503 on the forward end of the latter engages a pin 504 carried by the bellcrank 391. A pair of pawls 505 (Fig. 19) pivoted upon the pins 494a and 494b of plate 1193, and urged toward each other by a common spring 506, engage notches formed in a stationary centralizer 507 secured as by pins 508 to the bracket 500, thereby steadying the pin 486a on top of the link 486 as the latter is moved rearwardly from beneath the pawl 485 carried by the stem of key 26.

The link 486 as it is lowered rocks the aforementioned nonadd control bail 462, thereby lowering the hook 237 to its neutral nonadd position and moving the bar 244 forward so that the pin 466 releases the symbol rack and also moves the clutch bar 182 forward to engage the clutch 50. The ensuing cycle causes the cam 491 (Fig. 18a) to engage the roller 493, thereby pulling the links 488 and 486 rearwardly.

The cam 491 is so timed that it immediately moves the link 486 rearwardly before the racks 34 start forward. The rearward movement of the link 486 rocks the bellcrank 391, thereby lowering the counter assembly to engage the gears 377 (Fig. 2) with the rack extensions 284. Now, as the racks move forwardly, the counter dials 297 are rotated subtractively until their long teeth 398 engage the zero stops 399, thereby arresting the counter dials at zero positions and arresting the racks at positions numerically representing the value previously registered by the counter dials.

The link 486, in moving rearwardly, carries with it a spring urged pawl 509 (see also Fig. 22) pivoted at 510 upon an upright extension of the latter link, until a shoulder on the pawl snaps behind a pin 486c carried by plate 1192. The latter plate is now located as shown in Fig. 21 and as the link 486 moves forward again at approximately mid-cycle and after the racks have been fully advanced, the pawl 509 is thrust forwardly to rotate the control member 497 clockwise one-tenth of a revolution to the position shown in Fig. 22. This movement will move the pin 486a beyond a high portion 511 on the link 486, permitting the latter to rise to disengage its hook end 503 from the pin 504. A spring 513 now becomes effective to return the link, and springs, one of which is shown at 514, extending between the shafts 296 and 378 return the counter assembly to its normal position illustrated in Fig. 2.

As the pin 486a is leaving the high portion 511, the pin 494a will be moving toward a high portion 515 of the bar 494 (Fig. 19) thereby camming this bar downwardly to start a new machine cycle.

Because in initiating the latter cycle the pin 495 moves in a greater arc than the pin 192 above it, the link 496 is slotted, but eventually the pin 495 strikes the bottom of the slot, thereby pulling the link 496 and the pin 192, associated with the total bar, downwardly to effect a full forward movement of the accumulator positioning control bar 244 similar to that effected by the depression of the total key 18. This latter totalling cycle clears the accumulator 13 and prints the remainder or the product, depending upon whether the preceding problem was a division or multiplication.

In the last-mentioned movement of the control member 497 wherein the pin 494a cammed against the high portion 515, a pin 486d on the plate 1192 moves up to the position normally occupied by a pin 488c when the parts are in their home positions illustrated in Fig. 18. Therefore, as the racks move forward in the last-mentioned total taking cycle, a slide 516, provided with a slot 517 guided upon frame pins 518, moves forward because of its attachment to the end of the rack drive shaft 62. A bypass pawl 519 pivoted at 520 upon the latter slide and urged clockwise into its position shown by spring 521, moves over and forward of the pin 486d. Now, as the slide 516 is again pulled rearwardly by the shaft 62 during the latter half of the total-taking cycle, the pawl 519 pulling on the pin 486d will rotate the control member 497 two-tenths of a revolution, thereby depressing the link 488 by camming the pin 488a against the high portion 522 of the latter link as shown in Fig. 23.

As the link 488 is depressed, a pin 523 on the forward end thereof removes the latch 456 from engagement with the pin 455 (Fig. 18) and through the shaft 458 removes the latch 457 from engagement with the similar pin 451 (Fig. 24). At the same time a hook 524 on the forward end of the link 488 engages the pin 455.

A portion of the nonadd control bail 462 underlies the link 488 (Figs. 18 and 26) and is depressed by the latter link, thereby moving the pin 248 forwardly and initiating the third (nonadd) cycle in the same manner as the first cycle of the triple cycles.

However, the third cycle is effective to clear the storage gears 35 because the hook 524 rocks the levers 454 and 452 clockwise, thereby lowering the storage gears into engagement with the rack extensions 284 in the manner hereinbefore described and prior to the forward movement of the racks. This is accomplished in the same manner and by the same cams (490 and 491 Fig. 18a) as in the first cycle, but because of the pivot 487 the link 486 may be lowered independently of the link 488.

The link 488 also carries a spring urged pawl 509a like the pawl 509 and similarly pivoted at 510a upon an upright extension of the link 488, and as the latter link is lowered as in Fig. 23, the pin 488c will depress the pawl 509a and a shoulder on the latter will thus snap behind the latter pin as the link is drawn rearwardly, but as the link is again restored forwardly the pawl will thrust against the pin to rotate the member 497 one-tenth of a revolution to a position like Fig. 20 which is one of two home positions of the latter member. Note that because the plates of the member 497 are double ended, the latter member in reality has two home positions, i. e., 180° apart, and that because Fig. 20 is shown in the same original home position of Figs. 18 and 19, the actual home position after the above-described third cycle operation would reverse the plate ends with the pin 488c in front of the pawl 509a, following the progressive steps shown in Figs. 21, 22 and 23.

The storage gears 35 in clearing are rotated clockwise by the racks until the zero stops 281 thereon engage the conveyor link shoulders 283.

The last-described storage gear clearing cycle is a nonprint cycle and means for disabling the printer include a hook 525 provided on the forward end of the link 488. The hook 525 overlies a pin 526 carried on a lever 527 fixed to the left-hand end of a lateral shaft 528 having another lever 529 (Fig. 33a) fixed to the right hand end thereof. The latter lever carries a pin 530 engaging a hook 531 provided upon the forward end of a link 532 (see also Fig. 33) having a pivotal connection 533 at its rear end with a leg of a bail 534. The bail 534 and its linkage is clamped at 535 on a rock shaft 536 and is held rearwardly by a spring 138.

Depression of the link 488 during the last or storage gear clearing cycle of the triple cycles will cause the hook 525 to rock the shaft 528 to pull the link 532 forwardly and thereby rock the shaft 536. The shaft 536 is journalled in the side frame 173 and in an auxiliary printer frame 537, as best seen in Fig. 34. Another bail 538 (see also Fig. 35) is also clamped at 539 to the shaft 536 and is thus rocked clockwise during the above third cycle. A hook 540 (see also Fig. 33) provided on the bail 538 will now engage a set screw 541 fixed in the follower 112, thereby preventing the aforementioned rocking of the follower and the printing lever 115 from effecting printing.

The aforementioned ratchet means 134 (Figs. 37 and 38) for advancing the paper, and the ratchet means 148 for advancing the printer ribbon are also made inoperative by the clockwise rocking of the bail 538 because a hook 542 of the latter bail engages and lifts the pawl 149 from the ratchet 148 and a lug 543 of the bail 538 engages the pawl 136, thereby rocking the latter pawl upon the pin 137 and away from the ratchet 134.

As described, the bail 538 is rockable at one end by the shaft 536 but is pivoted or rockable at the other end upon a pin 544 fixed in a hanger 545 suspended from machine brace rods 546 and 547 (Fig. 38).

An increase in the rate of speed of the machine is available during the last cycle of the triple cycle by means of the link 532 but since this increase is available primarily for other purposes, it will be further described hereinafter under the heading "Speed control."

A latch 548 (Fig. 18) slidable upon frame pins 481 and 549 and urged forwardly by a tension spring 1548 is provided for latching the key 26 in depressed position. The stem of key 26 is provided with a shoulder 550 for latching beneath a lug 551 of the latch. The latch is releasable by a dog 552 pivoted thereto and engageable by a pin 553 carried by the lever 454. A link 554 pivotally connected to the link 488 has a pin and slot connection with the dog 552. The latter link is thereby effective to hold the dog above the pin 553 until the link 488 is depressed as above described. As the lever 454 is returned, the pin 553 will force the dog 552 rearwardly to cause the latch 548 to release the depressed key 26.

Since it is desired in the foregoing clearing operations that the racks be free to move forwardly until arrested by the engagement of a counter tooth 398 with a zero stop lug 399, or the engagement of a storage gear zero stop 281 with a shoulder 283, means are provided to maintain the zero blocks 48 out of blocking engagement with the shoulders 47 of the racks 34 during such clearing operations. To accomplish this a pin 344a is fixed in the lever 345 adjacent the lower end of the stem of the key 26. Thus as the key 26 is depressed to initiate the above-described triple clearing cycles the lever 345 will become effective to clear the keyboard as hereinbefore described.

*Printer control*

In performing certain types of calculations, such as addition and subtraction, it is desirable to print all factors and results. However, in multiplication and division calculations, it is desirable to print only the factors and results and not the repeated entries of the factors. Thus, in multiplication operations, and as noted on the sample tape (Fig. 14), only the multiplicand factor 22, the multiplier factor 24 and the product 27 are printed. Likewise, in division calculations, only the dividend factor 28, the divisor factor 31, the quotient 32 and the remainder 27 are printed, one directly below the other. In order to automatically suppress the printing of the repeated entries of the multiplicand and divisor factors, means are provided under control of the handle 23 for blocking the operation of the printing mechanism. Referring to Fig. 33a, the aforementioned lever 421 (see also Fig. 39) is provided with a pair of pins 555 and 556, normally positioned respectively adjacent and in the rear of a pair of shoulders 557 and 558 provided upon the aforementioned link 532. Therefore, when the handle 23, and consequently the lever 421, is rocked from its neutral position, the link 532 will be pulled forwardly and the printer will be blocked in the same manner as the hereinbefore described action of the lever 529. Thus, the printer shaft 103 will be prevented from rocking during the printing phase of a machine cycle as long as the multiply-divide handle is held rocked in either of its settings.

A spring 530a may be attached between the pin 530 and the shaft 296 to normally urge the shaft 528 in a clockwise direction.

Speed control

As noted hereinbefore, the printing instrumentalities of the machine are not utilized during the actual multiplication and division calculations and since such instrumentalities normally limit the speed of operation of a machine of this type, it is desirable to increase the speed of the machine during such multiplication and division operations. This is especially so since in the latter type of operations, repetitive cycles are required which would otherwise prolong the completion of such calculations. Therefore, an automatic speed control mechanism is provided for controlling the machine motor in accordance with the type of operation being performed.

Although the machine motor is not shown, the shaft 560 (Figs. 34 and 37) thereof is shown attached to a flyweight bracket 561 of a governor generally indicated at 1561. Pivot pins 562 and 563 on the bracket pivotally support flyweight levers 564 for movement about axes extending at right angles to the axis of rotation to the motor shaft. A ball 565 is mounted to freely move in a hole formed axially of a hub 566 secured to the bracket 561.

The center of gravity of each of the flyweight levers 564 lies to the left (Fig. 37) of the respective pivot pins 562 and 563 so that as the motor accelerates, the inner adjacent ends of the flyweight levers move to the left through longitudinally extending slots in the hub 566 and thereby force the ball 565 outwardly against an ear 567 of a lever 568. The latter is pivoted at 570 on a stationary bracket 571. A tab 572 on the lever overlies a plunger 573 of a normally closed switch generally indicated at S, located in the motor circuit. Thus, as the motor accelerates, the lever 568 will be rotated counter-clockwise, about the pivot 570, as viewed in Fig. 34, to momentarily force the plunger 573 inward to open the switch circuit and thus permit deceleration of the motor.

The aforementioned governor is initially set at a predetermined speed commensurate with the desired speed for driving the machine during such calculations as embody printing operations. For this purpose, a compression spring 574 is interposed between the ears 567 of lever 568 and an adjustable pin 569 slidable in the bore of a boss 575 fixed in the outer extremity of the bracket 571. The spring 574 thus places initial inward pressure against the lever 568 and the flyweights 564, and this is sufficient to overcome the action of a light tension spring 576 extending between the ear 567 and the outer extremity of the bracket 571.

Means provided in order to increase the motor speed during multiplication and division operations include a link 602 (Figs. 33, 34, 36 and 37) pivotally connected at 577 to a leg of the bail 534. The link 602 is provided with a conventional loop 578 for adjustment purposes, and an angled struck-out tongue 579 at the rearward end thereof provides legs 580 of a bifurcated portion to embrace a groove 581 formed in the boss 575.

As the multiply-divide handle 23 is rocked into one or the other of its alternate settings to effect multiplication or division operations, it will, through the aforementioned lever 421, and link 532, cause the tongue 579 of the link 602 to cam the pin 569 inwardly, thereby compressing the spring 574. Therefore, the additional pressure of the spring 574 imposed upon the ball 565 is sufficient to reduce the effect of the flyweight levers 564 and thus permit a higher speed to be obtained during such multiplication and division operations.

It is possible, as mentioned hereinbefore, to rock the handle 23 from its add to subtract settings and vice versa before completion of a current cycle controlled thereby. Also, since it is desirable that the above-described speed increasing mechanism be actuated during the entire multiplication or division cycle, and since the paper and ribbon advancing mechanisms are normally actuated during the latter part of a cycle, it is necessary that the speed increasing mechanism and the printer, paper, and ribbon disabling mechanism be maintained in effective condition independently of the position of the handle during all stages of each cycle.

For this purpose, a hook formed on the rear end of a lever 582 is provided to engage and lock the tongue 579 in its forward or speed-increasing position and also thereby hold the bail 538 in its rocked position. The lever 582 is pivoted upon a frame pin 583 and is urged counter-clockwise by a spring 584 to hold a cam nose 585 thereof in engagement with a roller 586 carried on a disc 587 which is keyed to the drive shaft 49. When the machine is in a completed full cycle condition, as shown in Fig. 33, or while the machine is operating in straight addition or subtraction problems, the hook end of the lever 582 is forward of the tongue 579. However, when the link 532 is pulled forward and just after the start of a cycle initiated at that time, the roller 586 will pass from beneath the cam nose 585, thereby permitting the spring 584 to pull the hook of the lever 582 upwardly in the rear of the tongue 579. Just before the completion of the cycle the roller 586 will again engage the nose 585 of the lever 582, rocking the same to release the tongue 579 and its linkage, permitting the same to be returned by the spring 138.

What we desire to secure by United States Letters Patent is:

1. In a calculating machine, the combination of denominationally arranged amount storage gears, denominationally arranged differential actuator racks cooperable with said gears, means for controlling operation of said racks, a pair of spaced wheel elements, means rotatably supporting said elements, a flexible endless support carried by said wheel elements and supporting said amount storage gears for movement into different denominational relationships relative to said differential actuators, means for moving said support, and means for moving said wheel elements to move said gears into and out of mesh with said racks.

2. In a calculating machine, the combination of a register, denominationally arranged differential actuator racks for said register, denominationally arranged storage gears cooperable with said racks and adapted to differentially control said racks, means for operating said racks, a pair of spaced wheel elements, a flexible endless support carried by said wheel elements and supporting said amount storage gears for movement into different denominational relationships relative to said differential actuators, a device for guiding said endless support from one of said wheel elements to the other, a support for said wheel elements and said guiding means, and means for moving said last mentioned support to move said gears into and out of mesh with said racks.

3. In a calculating machine, the combination of denominationally arranged amount storage gears, denominationally arranged differential actuator racks cooperable with said gears, means for controlling operation of said racks, a pair of spaced sprockets, means rotatably supporting said sprockets, an endless chain device carried by said sprockets and supporting said storage gears for movement into different denominational relationships relative to said racks, means comprising a manually adjustable instrumentality moveable into any of different positions for moving said chain device whereby to move said storage gears into different denominational relationships, respectively, relative to said racks, and means controlled by said manually adjustable instrumentality when in any of said positions thereof for causing operation of said operation controlling means, and for causing said gears to mesh with said racks.

4. In a calculating machine, the combination of denominationally arranged differential actuator racks, means for controlling operation of said racks, a pair of spaced sprockets, means rotatably supporting said sprockets, an endless chain device comprising a plurality of links and pins pivotally connecting said links together; said chain device being carried by said sprockets denominationally arranged amount storage gears rotatably carried by said links and adapted to mesh with said racks, a guideway for guiding said pins from one sprocket to another, and means for moving said chain device over said sprockets whereby to move said storage gears into different denominational relationships relative to said racks.

5. In a calculating machine, the combination of a register, denominationally arranged actuators for said register, denominationally arranged amount storage devices cooperable with said actuators and adapted to differentially control said actuators, a device including a control element selectively settable into either of two conditions for causing said actuators to selectively drive said register in an additive direction or a subtractive direction, respectively, a control shaft, means for rockably supporting said shaft, means operable by said shaft upon rocking thereof in one direction for setting said control element in one of said conditions and operable by said shaft upon rocking thereof in the opposite direction for setting said control element in the other of said conditions, a handle splined to said shaft for rocking the same, said handle being operatively connected to said amount storage devices and movable along said shaft for adjusting said storage devices into different denominational relationships relative to said actuators.

6. In a calculating machine, the combination of a register, denominationally arranged actuators for said register, denominationally arranged amount storage devices cooperable with said actuators and adapted to differentially control said actuators, a device including a control element actuatable to cause said actuators to drive said register; a control shaft, means rockably supporting said shaft, means normally maintaining said shaft in a medial rocked position, means controlled by said shaft upon rocking thereof in one direction from said medial position for actuating said control element to cause said actuators to drive said register in an additive direction, said last mentioned means being controlled by said shaft upon rocking thereof in an opposite direction from said medial position to cause said actuators to drive said register in a subtractive direction, a handle, said handle being operatively connected to said amount storage devices and moveable along the length of said shaft whereby to move said storage devices into different denominational relationships with said actuators, and means for enabling said handle to rock said shaft when in any of different positions along said shaft.

7. In a calculating machine, the combination of a register, denominationally arranged actuators for said register, denominationally arranged amount storage devices cooperable with said actuators and adapted to differentially control said actuators, a device including a control element actuatable to cause said actuators to drive said register; a control shaft, means rockably supporting said shaft, means normally maintaining said shaft in a medial rocked position, means controlled by said shaft upon rocking thereof in one direction from said medial position for actuating said control element to cause said actuators to drive said register in an additive direction, said last mentioned means being controlled by said shaft upon rocking thereof in an opposite direction from said medial position to cause said actuators to drive said register in a subtractive direction, a carrier moveable along said shaft, means enforcing said shaft and said carrier to rock as a unit, means operatively connecting said carrier to said storage devices whereby to move said storage devices into different denominational positions relative to said actuators upon movement of said carrier along said shaft, and a manually operable handle operatively connected to said carrier.

8. A calculating machine comprising the combination of a register, denominationally arranged differential actuators for said register, denominationally arranged storage devices cooperable with said actuators and adapted to differentially control said actuators, drive means for said actuators, means comprising a manually adjustable element movable into any of different denominational locations for adjusting said storage devices into different denominational relationships, respectively, relative to said actuators, said element being actuatable when in any of said locations, means controlled by said element upon actuation thereof for causing said drive means to operate said actuators, a cover for said machine, said cover having an opening therein through which said manually adjustable element is movable, and shielding means for covering the portions of said opening not occupied by said manually adjustable element when in any of said positions.

9. In a calculating machine, the combination comprising denominationally arranged amount storage devices, denominationally arranged differential actuators cooperable with said devices, means for controlling operation of said actuators, guide means for a flexible endless support, a flexible endless support carried by said guide means and supporting said amount storage devices for movement into different denominational relationships relative to said differential actuators, a cover for said machine, said cover having an opening therein, a rockable control shaft, means operable by said shaft upon rocking thereof for operating said controlling means, a manually operable handle extending through said opening, means mounting said handle on said shaft to prevent relative rotation therebetween and to permit movement of said handle along said shaft, and means operatively connecting said handle to said support whereby to enable manual adjustment of said support into any of said positions to move said storage devices into different denominational relationships, respectively, relative to said actuators.

10. In a calculating machine, the combination of denominationally arranged storage devices, denominationally arranged differential actuators cooperable with said devices, drive means for said actuators, means for controlling operation of said drive means, a pair of spaced wheel elements, means rotatably supporting said elements, a flexible endless support carried by said wheel elements and supporting said amount storage devices for movement into different denominational relationships relative to said differential actuators, a rockable control shaft, means operable by said shaft upon rocking thereof for operating said controlling means, a manually operable handle, means mounting said handle on said shaft to prevent relative rotation therebetween and to permit movement of said handle along said shaft, and means operatively connecting said handle to said flexible support whereby to enable said handle to adjust said amount storage devices into any of different denominational positions.

References Cited in the file of this patent

UNITED STATES PATENTS

| | | |
|---|---|---|
| 605,909 | Peters | June 21, 1898 |
| 978,111 | Callahan | Dec. 6, 1910 |
| 1,081,791 | Trinks | Dec. 16, 1913 |
| 1,120,746 | Rinsche | Dec. 15, 1914 |
| 1,416,974 | Piscicelli | May 23, 1922 |
| 1,912,133 | Hamann | May 30, 1933 |
| 2,237,881 | Landsiedel | Apr. 8, 1941 |
| 2,374,333 | Crosman | Apr. 24, 1945 |
| 2,399,170 | Chase | Apr. 30, 1946 |
| 2,545,649 | Capellaro | Mar. 20, 1951 |
| 2,656,980 | Fox | Oct. 27, 1953 |
| 2,678,162 | Hutton | May 11, 1954 |